(12) United States Patent
Lin

(10) Patent No.: US 12,136,441 B2
(45) Date of Patent: Nov. 5, 2024

(54) VIDEO PROCESSING METHOD, DEVICE, STORAGE MEDIUM, AND PROGRAM PRODUCT

(71) Applicant: Honor Device Co., Ltd., Shenzhen (CN)

(72) Inventor: Yuhang Lin, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/002,799

(22) PCT Filed: Aug. 16, 2022

(86) PCT No.: PCT/CN2022/112858
§ 371 (c)(1),
(2) Date: Dec. 21, 2022

(87) PCT Pub. No.: WO2023/035882
PCT Pub. Date: Mar. 16, 2023

(65) Prior Publication Data
US 2024/0144976 A1    May 2, 2024

(30) Foreign Application Priority Data

Sep. 10, 2021 (CN) .......................... 202111062379.5

(51) Int. Cl.
*G11B 27/034* (2006.01)
*G11B 27/34* (2006.01)
*G11B 27/36* (2006.01)

(52) U.S. Cl.
CPC ............ *G11B 27/034* (2013.01); *G11B 27/34* (2013.01); *G11B 27/36* (2013.01)

(58) Field of Classification Search
CPC ........ G11B 27/034; G11B 27/34; G11B 27/36
See application file for complete search history.

(56) References Cited

U.S. PATENT DOCUMENTS

| 9,942,484 B2 | 4/2018 | Pan et al. |
| 10,057,482 B2 | 8/2018 | Miyakawa et al. |

(Continued)

FOREIGN PATENT DOCUMENTS

| CN | 102917270 A | 2/2013 |
| CN | 105279161 A | 1/2016 |

(Continued)

*Primary Examiner* — Sunghyoun Park
(74) *Attorney, Agent, or Firm* — Rimon PC

(57) ABSTRACT

Embodiments of this application provide a video processing method, a device, a storage medium. The method includes: obtaining a video file in response to a video editing operation; receiving an edition mode selection operation, and determining at least one edition type in a selected edition mode based on the edition mode selection operation; decoding the video file to obtain a multi-frame target video image; and separately rendering the multi-frame target video image based on the at least one edition type, and displaying, in a display interface, the rendered multi-frame target video image in a display window of a corresponding edition type; where the display interface includes at least one display window, and the at least one display window is in a one-to-one correspondence with the at least one edition type. This enables a user to intuitively observe differences of applications of different edition types on a video file.

20 Claims, 37 Drawing Sheets

(56) References Cited

U.S. PATENT DOCUMENTS

| | | | |
|---|---|---|---|
| 2014/0237365 A1* | 8/2014 | Oberbrunner | H04N 21/234 715/722 |
| 2015/0346938 A1* | 12/2015 | Gerhardt | G06Q 30/0276 715/723 |
| 2015/0370474 A1 | 12/2015 | Belaunde et al. | |
| 2017/0085809 A1 | 3/2017 | Lee et al. | |
| 2018/0176550 A1 | 6/2018 | Bamford et al. | |
| 2021/0358524 A1* | 11/2021 | Zheng | G11B 27/036 |

FOREIGN PATENT DOCUMENTS

| | | |
|---|---|---|
| CN | 105323456 A | 2/2016 |
| CN | 105357451 A | 2/2016 |
| CN | 106254764 A | 12/2016 |
| CN | 106331502 A | 1/2017 |
| CN | 107864335 A | 3/2018 |
| CN | 109309783 A | 2/2019 |
| CN | 111083374 A | 4/2020 |
| CN | 111885298 A | 11/2020 |
| CN | 112165632 A | 1/2021 |
| CN | 112954210 A | 6/2021 |
| CN | 113194255 A | 7/2021 |
| CN | 113691737 A | 11/2021 |
| CN | 113747240 A | 12/2021 |
| JP | 2003092706 A | 3/2003 |
| WO | 2013175784 A1 | 11/2013 |

* cited by examiner

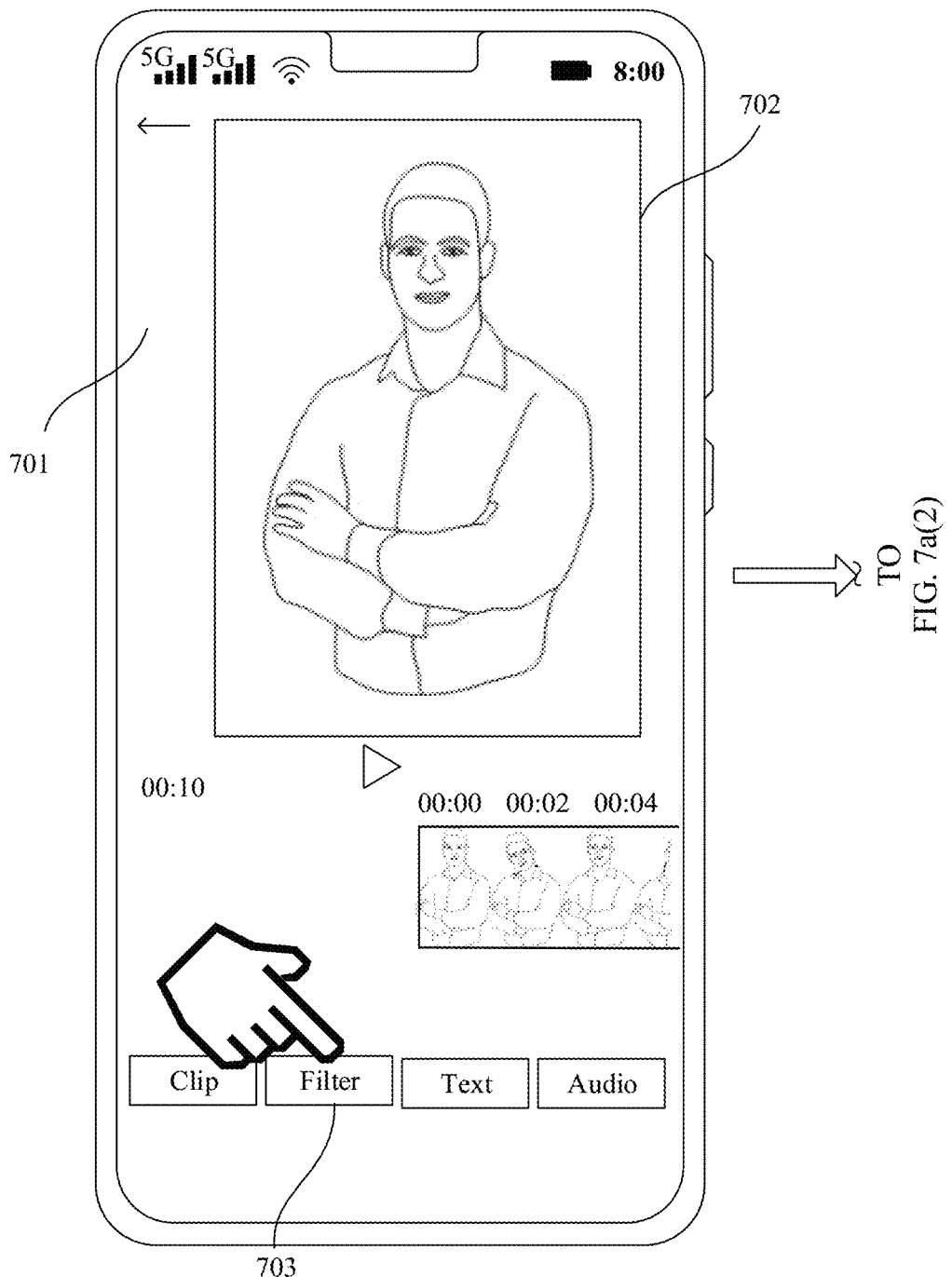
FIG. 7a(1)

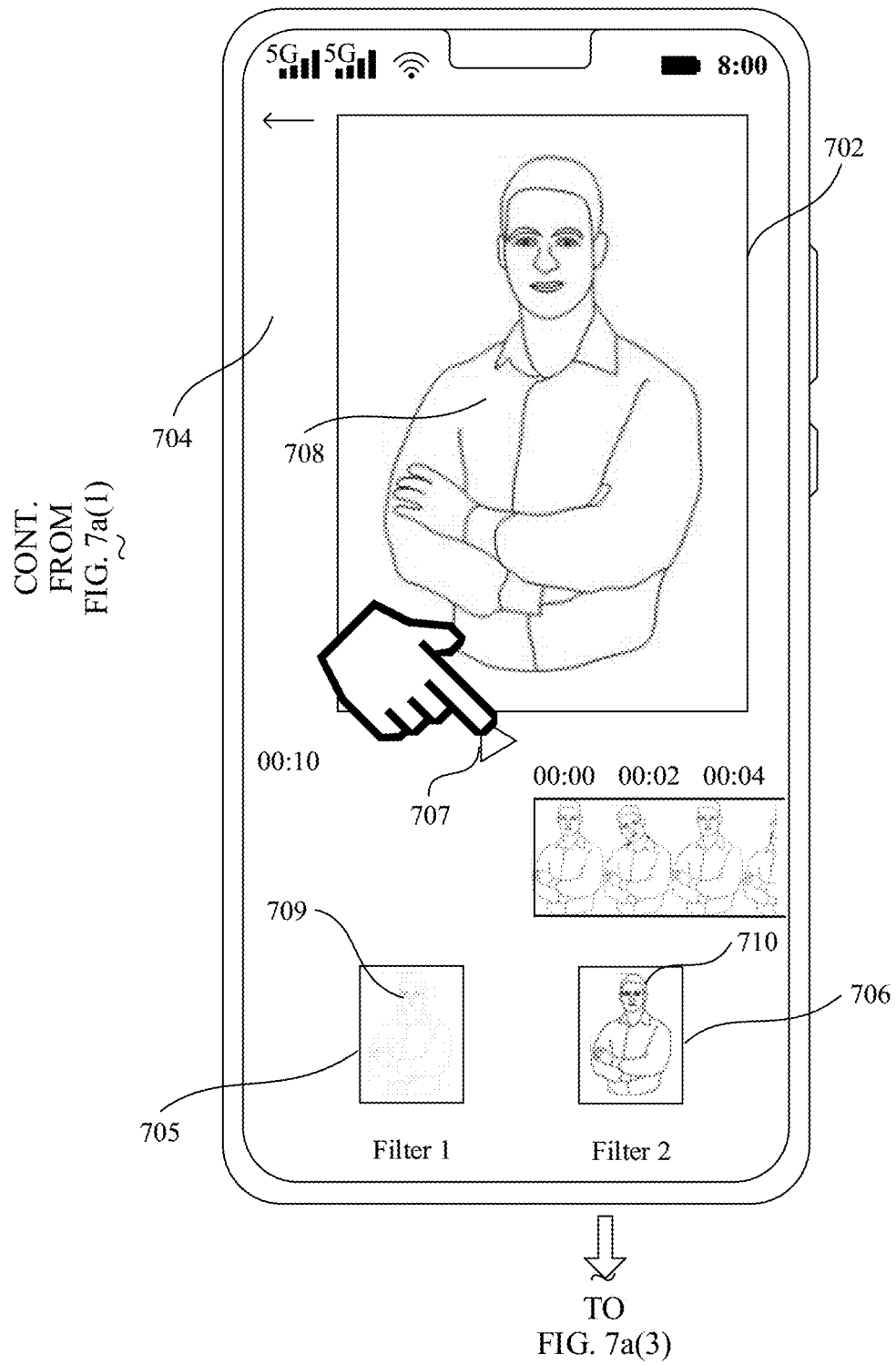
FIG. 7a(2)

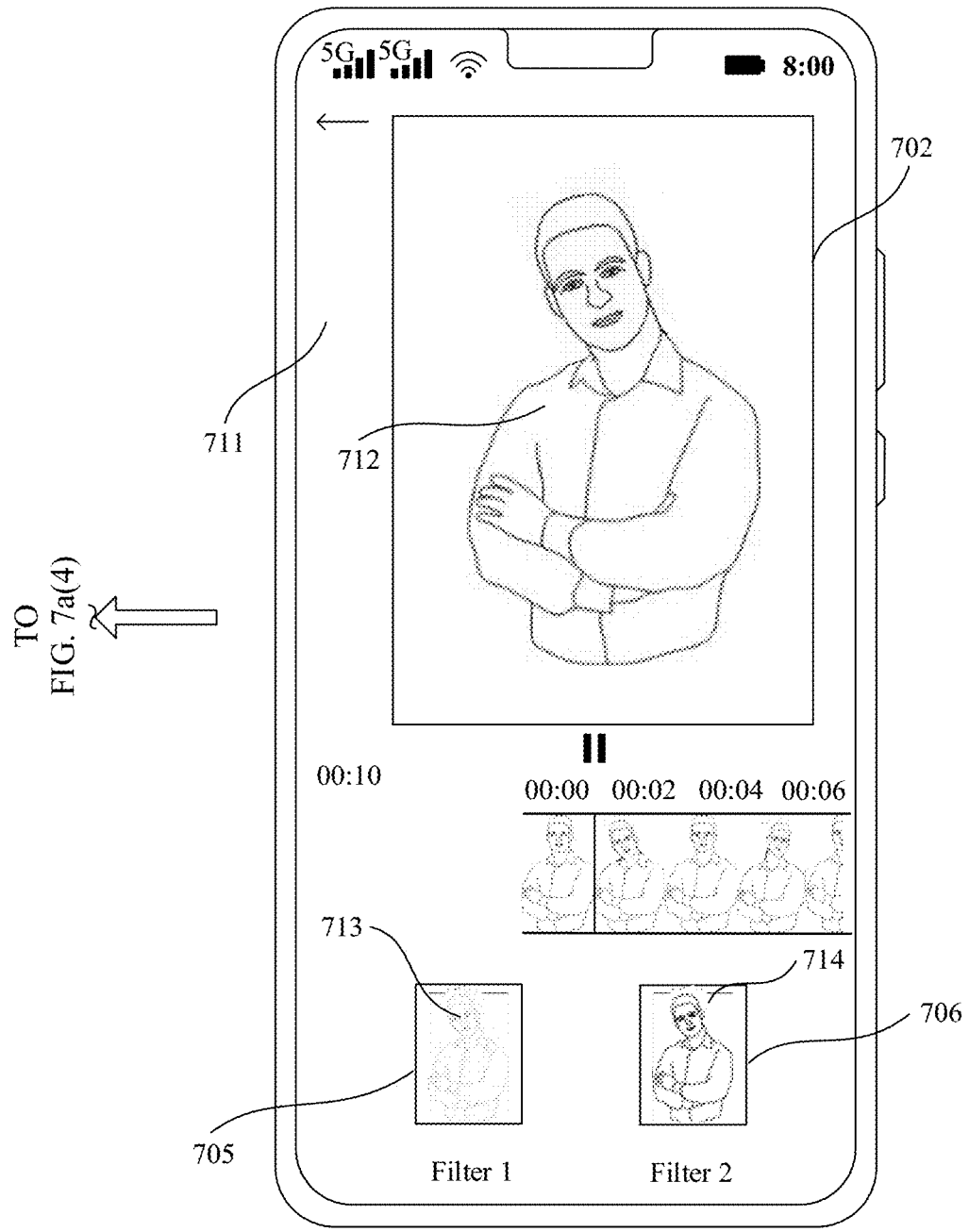
FIG. 7a(3)

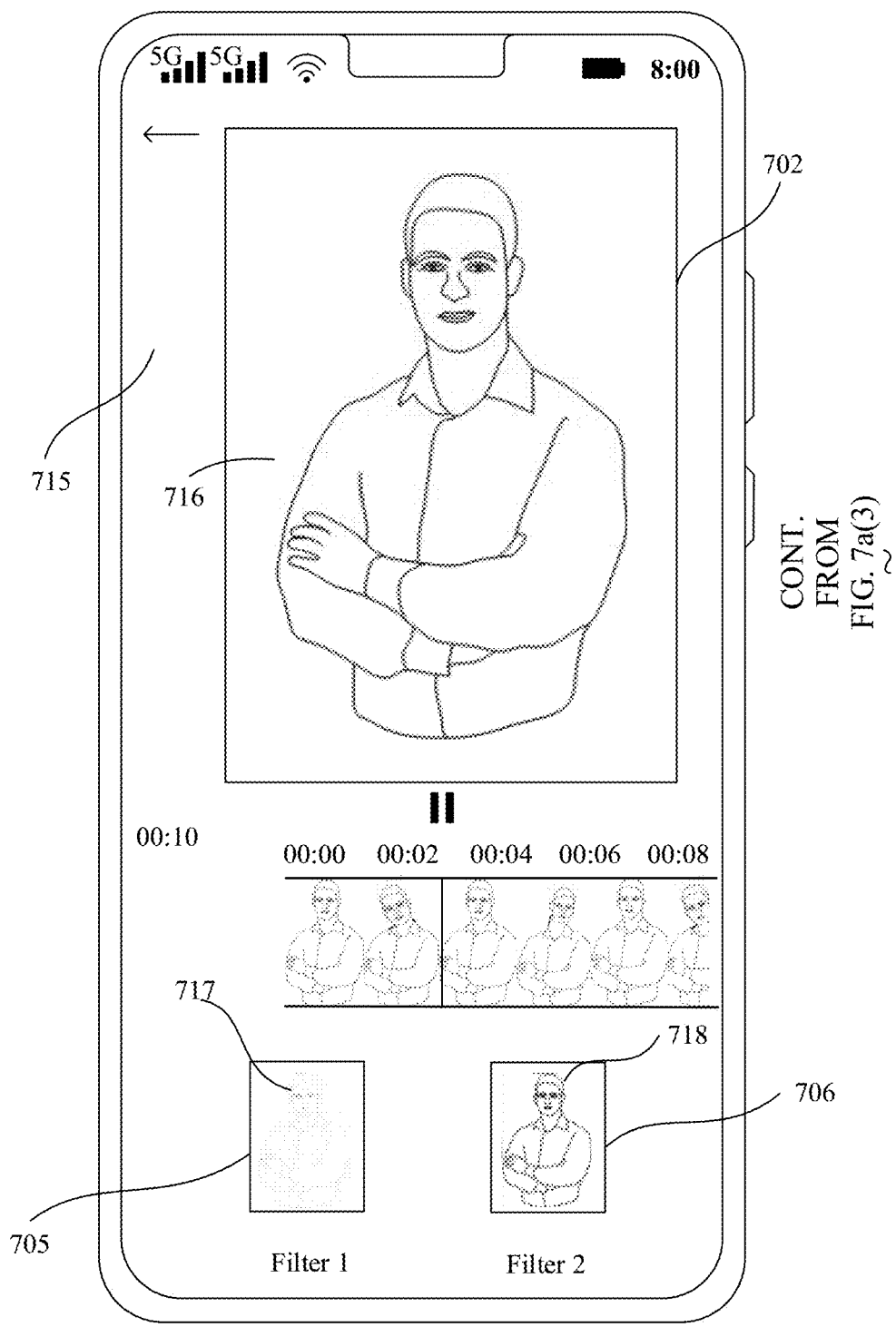
FIG. 7a(4)

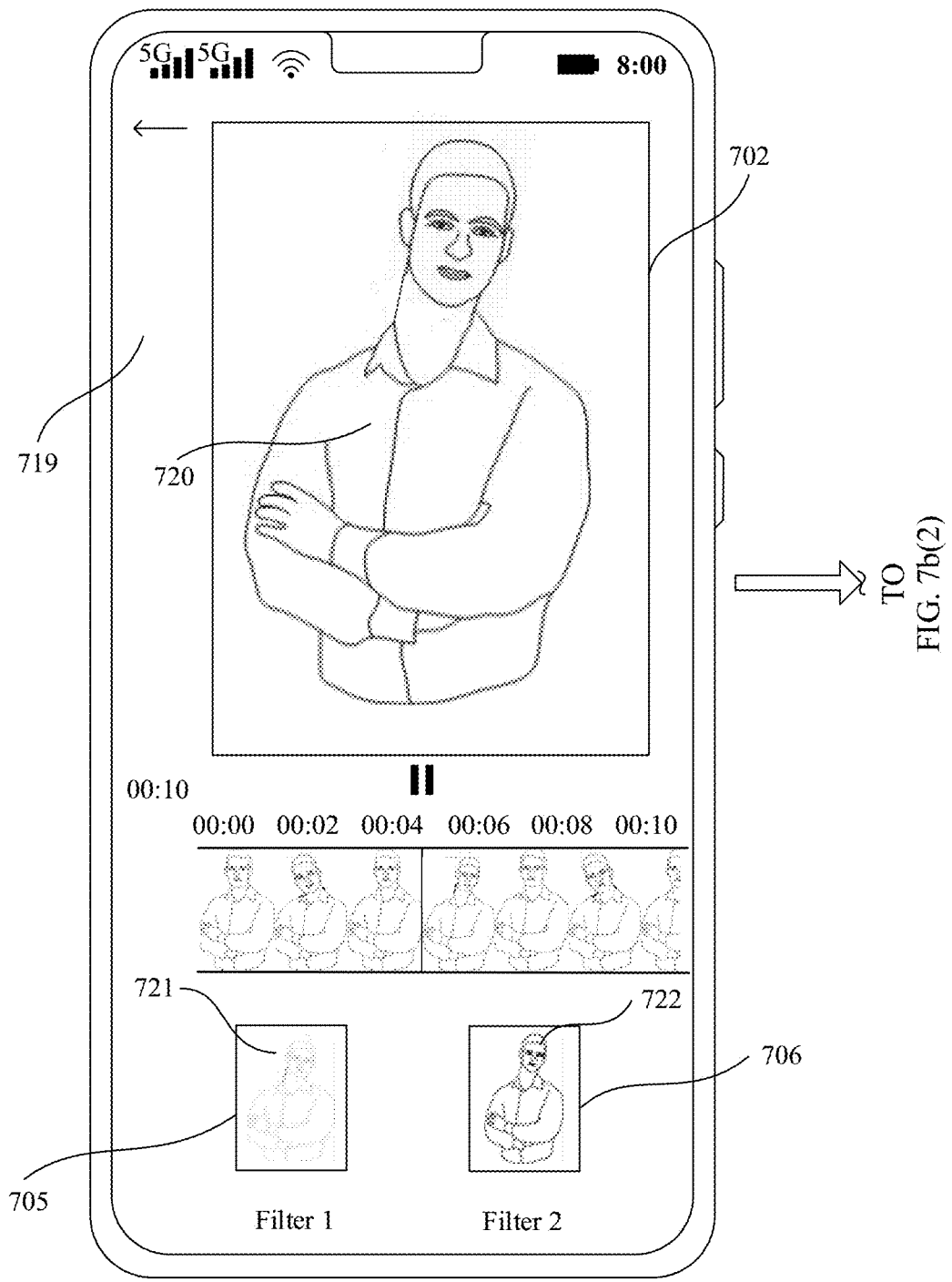
FIG. 7b(1)

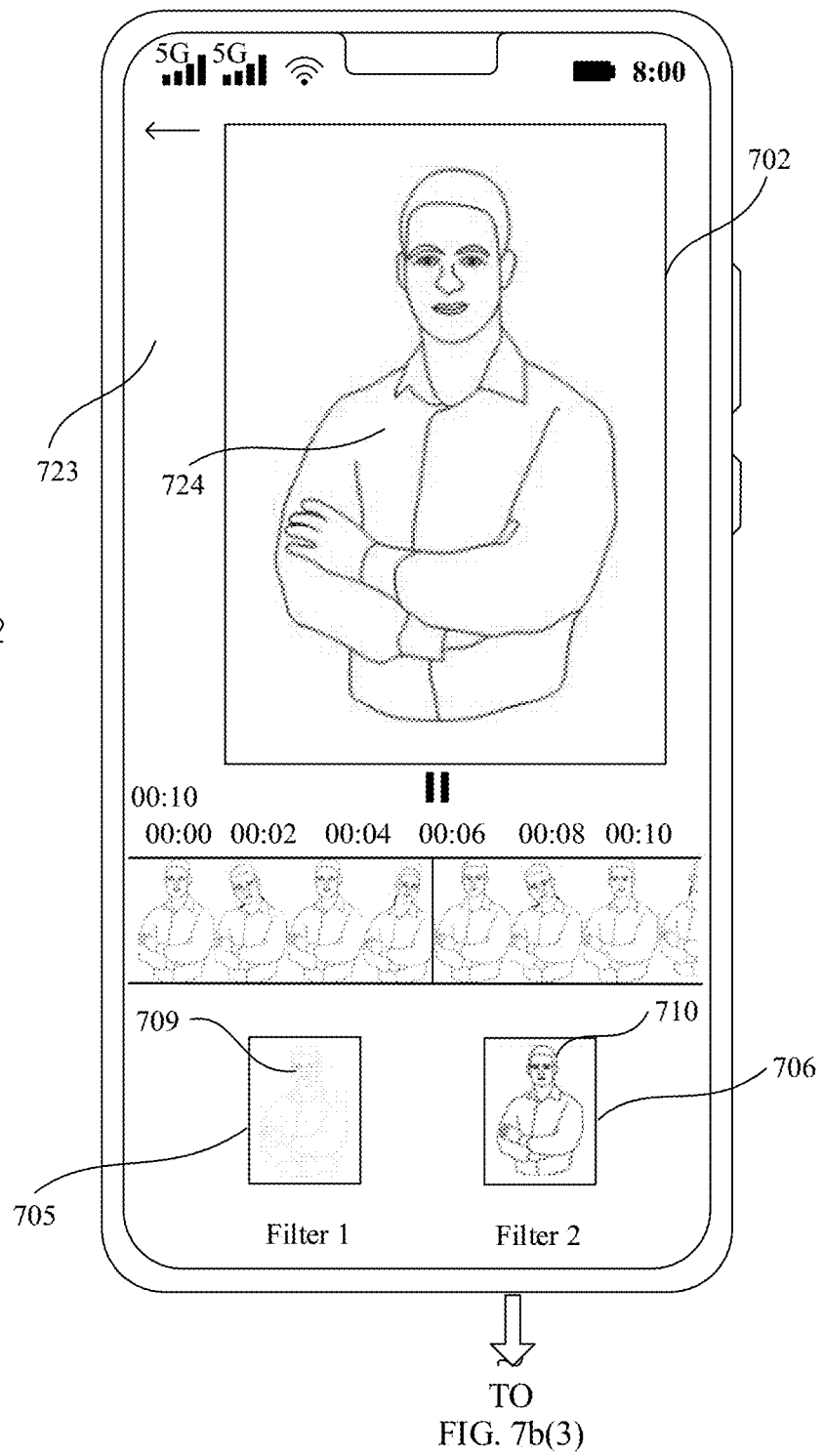
FIG. 7b(2)

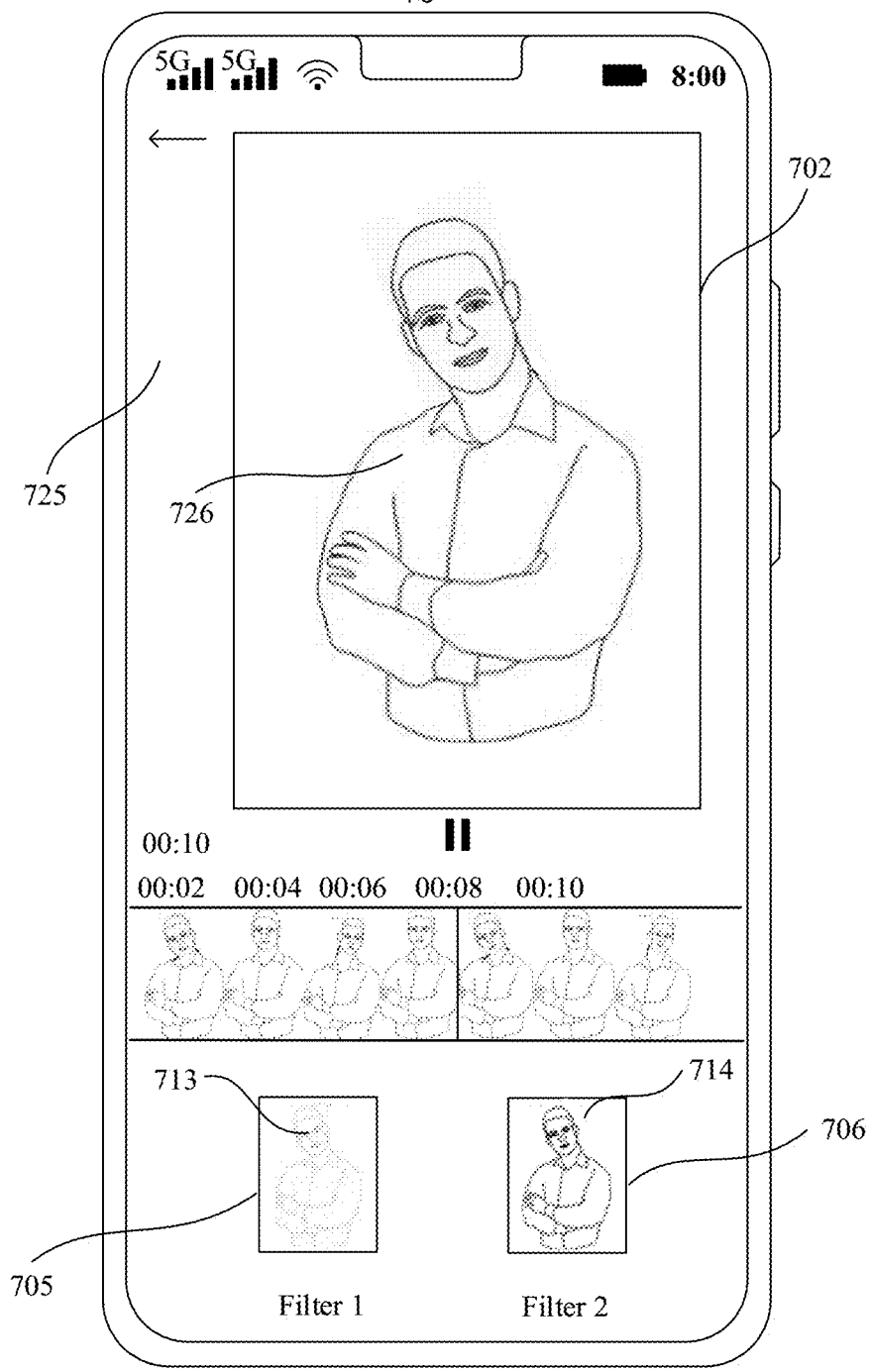
FIG. 7b(3)

VIDEO PROCESSING METHOD, DEVICE, STORAGE MEDIUM, AND PROGRAM PRODUCT

CROSS-REFERENCE TO RELATED APPLICATIONS

This application is a national stage of International Application No. PCT/CN2022/112858, filed on Aug. 16, 2022, which claims priority to Chinese Patent Application No. 202111062379.5, filed on Sep. 10, 2021. The disclosures of both of the aforementioned applications are hereby incorporated by reference in their entireties.

TECHNICAL FIELD

This application relates to the field of computer technologies, and specifically, to a video processing method, a device, a storage medium, and a program product.

BACKGROUND

With the development of the Internet and the development of a mobile communication network, and with the rapid development of a processing capability and a storage capability of an electronic device, a large quantity of applications are rapidly propagated and used, especially a video application.

A video is a variety of technologies for capturing, recording, processing, storing, transmitting, and reproducing a series of static images through electrical signals. When continuous images change more than a specific quantity of frames of images per second, a human eye cannot distinguish a single static image, and sees a smooth and continuous visual effect. In this way, such continuous images are referred to as a video. In a related technology, to meet visual requirements of different users, the user may further be allowed to edit the video.

During edition of the video, a filter may be added to the video to beautify the video. Currently, in a video editing manner on an electronic device, an effect achieved after the filter is added to the video cannot be previewed in real time, but is replaced with an effect image. Even when the effect achieved after the filter is added to the video can be previewed on the electronic device, a specific type of filter needs to be applied to the video, so that a filter effect can be observed, but a plurality of filter effects of the video cannot be observed at the same time. In the foregoing manner, the user cannot intuitively observe a difference when different filters are applied to the video, and this is inconvenient for the user to make a choice, and user experience is reduced.

SUMMARY

In view of this, this application provides a video processing method, a device, a storage medium, and a program product, to resolve a problem in a conventional technology that user experience is relatively poor because a user cannot intuitively observe a difference between different filters or special effects that are applied on a video.

According to a first aspect, an embodiment of this application provides a video processing method, where the method is applied to an electronic device, and the method includes:

receiving an editing operation for a target video;

displaying a first preview interface in response to the editing operation for the target video, where the first preview interface includes a preview box, the target video is displayed in the preview box, and the target video is a video obtained after a target video file is decoded;

receiving a first operation for the first preview interface; and displaying a second preview interface in response to the first operation, where the second preview interface includes a preview box, a first window, and a second window; where at a first moment, the target video is displayed in the preview box, an $i^{th}$ frame of video image of the first video is displayed in the first window, an $i^{th}$ frame of video image of the second video is displayed in the second window, the first video is a video obtained after a first sampled video is rendered by using a first filter, the first video includes m frames of video images, the second video is a video obtained after a second sampled video is rendered by using a second filter, the second video includes m frames of video images, both the first sampled video and the second sampled video are videos formed by sampling m frames of video images from the video obtained after the target video file is decoded, i is an integer greater than 0 and less than m, and m is an integer greater than 1; and at a second moment, the target video is displayed in the preview box, an $(i+1)^{th}$ frame of video image of the first video is displayed in the first window, and an $(i+1)^{th}$ frame of video image of the second video is displayed the second window.

In this embodiment of this application, the video obtained after the target video file is decoded may be rendered by using different types of filters, and the video is displayed in a corresponding window, so that a user can intuitively observe a difference between different filters applied to the video obtained after the target video file is decoded, and therefore, the user can choose a required edition type, and user experience is improved.

In a possible implementation, that both the first sampled video and the second sampled video are videos formed by sampling m frames of video images from the video obtained after the target video file is decoded includes:

decoding the target video file once to obtain a third video, and sampling m frames of video images in the third video to form the first sampled video and the second sampled video respectively.

In this way, the electronic device only needs to decode the target video file once to obtain the third video, and does not need to decode the target video file once for each filter type, so that redundant overheads of repeated decoding are avoided, a processing speed of the electronic device is improved, and occupied resources are reduced.

In a possible implementation, a value of m is less than a quantity of frames of video images included in the third video.

In this way, the first sampled video and the second sampled video need to be formed only based on some video images included in the third video, so that resource loss of the electronic device is reduced and a processing speed of the electronic device is improved without affecting viewing experience of the user.

In a possible implementation, the sampling m frames of video images in the third video to form the first sampled video and the second sampled video respectively includes:

sampling m frames of video images in the third video in a manner in which one frame of video image is sampled from every three frames of video images, to form the first sampled video and the second sampled video respectively.

In this way, one frame of video image may be sampled from every three frames of video image in the third video, and the m frames of video images are sampled to form the first sampled video and the second sampled image. In this way, resource loss of the electronic device is reduced and a processing speed of the electronic device is improved without affecting viewing experience of the user.

In a possible implementation, resolution of the first video and resolution of the second video are less than resolution of the target video.

In this way, detailed parts of the video images displayed in the first window and the second window can be reduced. Because a display size of the video image displayed in the first window and a display size of the video image displayed in the second window are less than a display size of the preview box, even if the detail parts of the video images displayed in the first window and the second window are reduced, the user can hardly experience a difference, resource loss of the electronic device can be reduced, and a processing speed of the electronic device can be improved.

In a possible implementation, a frame rate at which the first video is displayed in the first window and a frame rate at which the second video is displayed in the second window are less than a frame rate at which the target video is displayed in the preview box.

In this way, because the display size of the first window and the display size of the second window are less than the display size of the preview box, when the frame rate at which the video image is displayed in the first window and the frame rate at which the video image is displayed in the second window are reduced, a case in which the user can hardly watch the first video displayed in the first window and the second video displayed in the second window because a video image playing speed is excessively fast can be prevented. In addition, the frame rate at which the first video is displayed in the first window and the frame rate at which the second video is displayed in the second window are adjusted, so that resource loss of the electronic device can be reduced, and a processing speed of the electronic device can be improved.

In a possible implementation, that both the first sampled video and the second sampled video are videos formed by sampling m frames of video images from the video obtained after the target video file is decoded includes:
  separately decoding the target video file twice to obtain two third videos, sampling m frames of video images in one third video to form the first sampled video, and sampling m frames of video images in the other third video to form the second sampled video.

In this way, the electronic device may decode the target video file once for each type of filter to obtain the third video. This is simple to implement.

In a possible implementation, the second preview interface further includes a progress display box whose display size is less than a display size of the preview box, a video image in a fourth video is displayed in the progress display box, and the fourth video is the same as the target video image.

In this way, the user may adjust the video image in the progress display box, to adjust the video image displayed in the preview box, so that it is convenient for the user to adjust the video image displayed in the preview box, and editing experience of the user is improved.

In a possible implementation, resolution of the fourth video is less than resolution of the target video.

In this way, resource loss of the electronic device can be reduced, and a processing speed of the electronic device can be improved.

In a possible implementation, display sizes of the first window and the second window are the same.

In this embodiment of this application, to provide a better visual effect for the user to make a display interface neat, the display sizes of the first window and the second window that are displayed in the preview interface may be set to a same size.

In a possible implementation, display sizes of the first window and the second window are less than a display size of the preview box.

In this embodiment of this application, the display size of the first window and the display size of the second window are less than the display size of the preview box. In this way, a possibility that a display effect of the preview box is affected because the display size of the first window and the display size of the second window are excessively large can be reduced.

In a possible implementation, the displaying a first video in the first window includes: cyclically displaying the first video in the first window; and
  the displaying a second video in the second window includes: cyclically displaying the second video in the second window.

In this embodiment of this application, because the display sizes of the first window and the second window are relatively small, cyclically playing the first video and the second video can enable the user to more clearly watch the first video displayed in the first window and the second video displayed in the second window, and ensure that the user can always watch the first video displayed in the first window and the second video displayed in the second window, so that user experience is improved.

In a possible implementation, the method further includes:
  receiving a second operation for the second preview interface, where the second operation is used to indicate a target filter selected by a user; and
  displaying a third preview interface in response to the second operation, where the third preview interface includes a preview box, a first window, and a second window; where
  a fifth video is displayed in the preview box, the first video is displayed in the first window, the second video is displayed in the second window, and the fifth video is a video obtained after the target video is rendered by using the target filter.

In this embodiment of this application, the user may select the target filter, and display, in the preview box, the target video rendered by using the target filter, so that the user watches, through the preview box with a relatively large display size, the target video rendered by using the target filter selected by the user, and user experience is improved.

According to a second aspect, an embodiment of this application provides an electronic device, including a memory configured to store a computer program instruction and a processor configured to execute the program instruction. When the computer program instruction is executed by the processor, the electronic device is triggered to perform the method according to any implementation of the first aspect.

According to a third aspect, an embodiment of this application provides a computer-readable storage medium.

The computer-readable storage medium includes a stored program, and when the program runs, a device in which the computer-readable storage medium is located is controlled to perform the method according to any implementation of the first aspect.

According to a fourth aspect, an embodiment of this application provides a computer program product. The computer program product includes an executable instruction, and when the executable instruction is executed on a computer, the computer is enabled to perform the method according to any implementation of the first aspect.

According to the technical solution provided in embodiments of this application, during edition of a video, m frames of video images obtained after a target video file is decoded are used as a first sampled video and a second sampled video, the first sampled video is rendered by using a first filter to obtain a first video, the second sampled video is rendered by using a second filter to obtain a second video, the first video is displayed in a first window, and the second video is displayed in a second window; at a first moment, an $i^{th}$ frame of video image of the first video is displayed in the first window, and an $i^{th}$ frame of video image of the second video is displayed in the second window; and at a second moment, an $(i+1)^{th}$ frame of video image of the first video is displayed in the first window, and an $(i+1)^{th}$ frame of video image of the second video is displayed in the second window. In this way, a video obtained after the target video file is decoded may be rendered by using different types of filters, and the video is displayed in a corresponding window, so that a user can intuitively observe a difference between different filters applied to the video obtained after the target video file is decoded, and therefore, the user can choose a required edition type, and user experience is improved.

BRIEF DESCRIPTION OF DRAWINGS

To describe technical solutions of embodiments of this application more clearly, the following briefly describes the accompanying drawings required for describing the embodiments. Apparently, the accompanying drawings in the following descriptions show merely some embodiments of this application, and a person of ordinary skill in the art may still derive other drawings from these accompanying drawings without creative efforts.

FIG. 7a(1), FIG. 7a(2), FIG. 7a(3), and FIG. 7a(4) are a schematic diagram of another video processing scenario according to an embodiment of this application;

FIG. 7b(1), FIG. 7b(2), and FIG. 7b(3) are a schematic diagram of another video processing scenario according to an embodiment of this application;

DESCRIPTION OF EMBODIMENTS

For better understanding of technical solutions of this application, embodiments of this application are described in detail below with reference to the accompanying drawings.

It should be noted that described embodiments are only some rather than all embodiments of this application. Based on the embodiments of this application, all other embodiments obtained by a person of ordinary skill in the art without creative efforts fall within the protection scope of this application.

Terms used in the embodiments of this application are merely for the purpose of describing a specific embodiment, and are not intended to limit this application. Singular forms "one" and "the" used in the embodiments of this application and the appended claims are also intended to include most forms unless another meaning is represented in context.

It should be understood that the term "and/or" used in this specification is merely an association relationship that describes associated objects, and represents that there may be three relationships. For example, A and/or B may represent three cases: only A exists, both A and B exist, and only B exists. In addition, the character "/" in this specification generally indicates that associated objects are in an "or" relationship.

For ease of understanding, terms involved in embodiments of this application are described herein in embodiments of this application.

(1) User experience (user experience, UX), also be referred to as a UX feature, is feeling of a user of using an electronic device in a photographing process.

(2) Filter: mainly used to implement various special effects of an image. A filter generally adjusts related data of the image, so that the image achieves a better sense of sight, including adjustment of a pixel value, brightness, saturation, contrast, and the like. For example, a pixel in an original image is represented by using RGB (red, green, and blue), and an RGB value of the pixel in the original image is replaced with a new RGB value, so that an image processed by using the filter has a special effect, and images processed by using different types of filters have different effects. There are many types of filter styles, such as monochrome and nostalgia for adjusting picture tone, soft focus for adjusting focus, and watercolour, pencil sketch, ink painting, oil painting, or the like for adjusting a picture style; or some filter styles may be self-defined by a user or a professional, such as fresh, Japanese style, landscape, or food.

Figure 1:
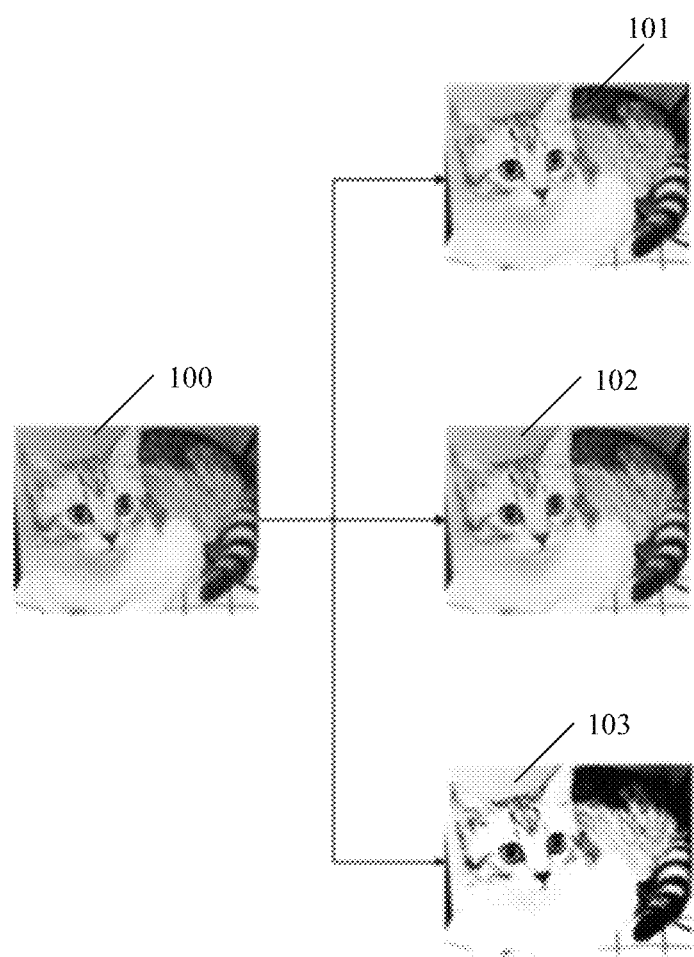
FIG. 1 is an example diagram of rendering effects of different filters according to an embodiment of this application.

It should be noted that when different filters are used to process a same image, image effects of different styles may be obtained. For example, a filter 1, a filter 2, and a filter 3 are separately three different filters. An original image 100 collected by a camera may be processed by using the filter 1, to obtain an image 101 shown in FIG. 1. The original image 100 collected by the camera may be processed by using the filter 2, to obtain an image 102 shown in FIG. 1. The original image 100 collected by the camera may be processed by using the filter 3, to obtain an image 103 shown in FIG. 1. It may be learned from comparison between the image 101, the image 102, and the image 103 shown in FIG. 1 that the image 101, the image 102, and the image 103 have different image effects or styles.

In addition to a mobile phone, an electronic device in embodiments of this application may be a tablet computer, a personal computer (personal computer, PC), a personal digital assistant (personal digital assistant, PDA), a smartwatch, a netbook, a wearable electronic device, an augmented reality (augmented reality, AR) device, a virtual reality (virtual reality, VR) device, a vehicle-mounted device, an intelligent vehicle, an intelligent sound, a robot, intelligent glasses, a smart TV, or the like.

It should be noted that, in some possible implementations, the electronic device may also be referred to as a terminal device, user equipment (User Equipment, UE), or the like. This is not limited in embodiments of this application.

Figure 2:
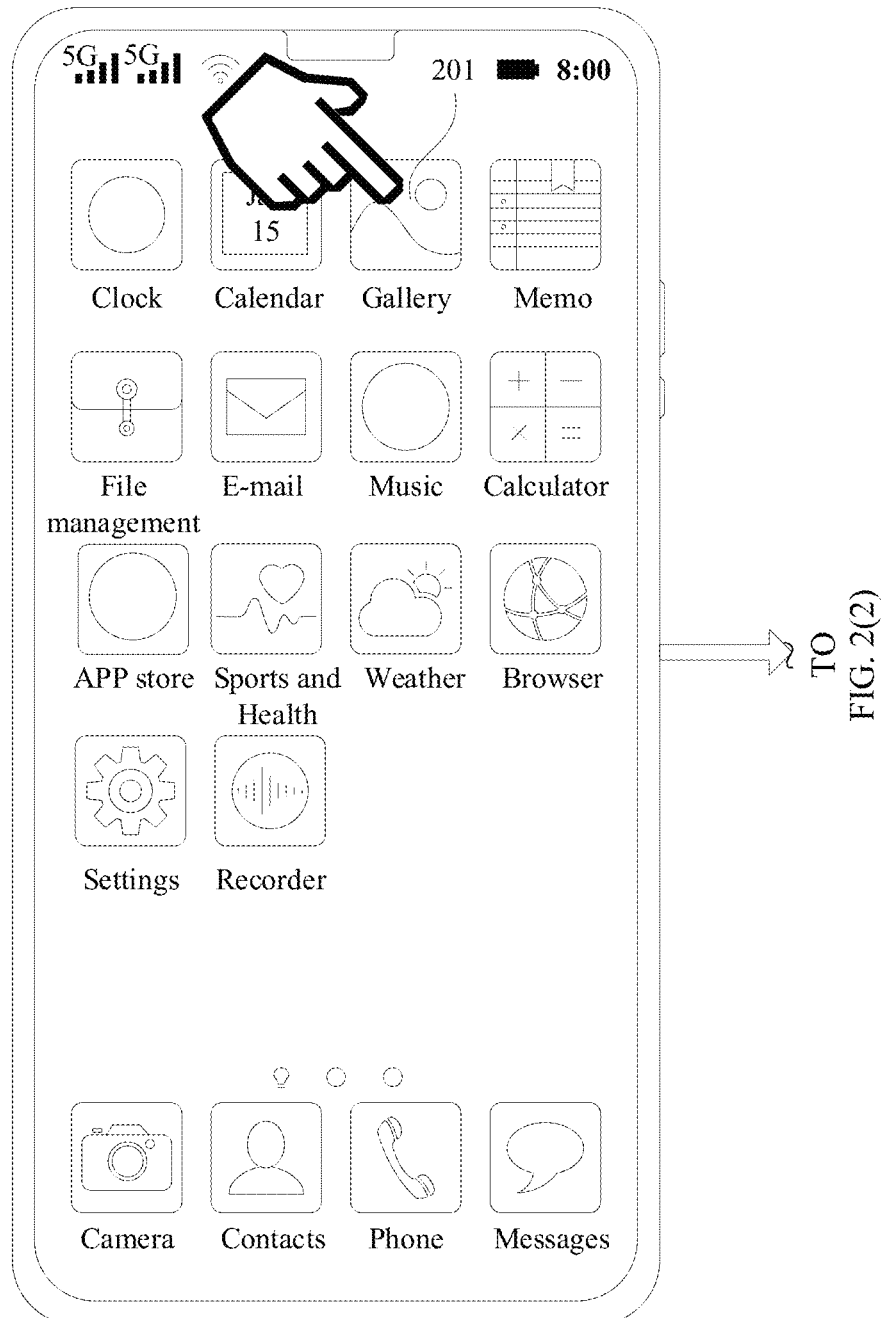
FIG. 2(1), FIG. 2(2), FIG. 2(3), and FIG. 2(4) are a schematic diagram of a video processing scenario according to an embodiment of this application.
Figure 2:
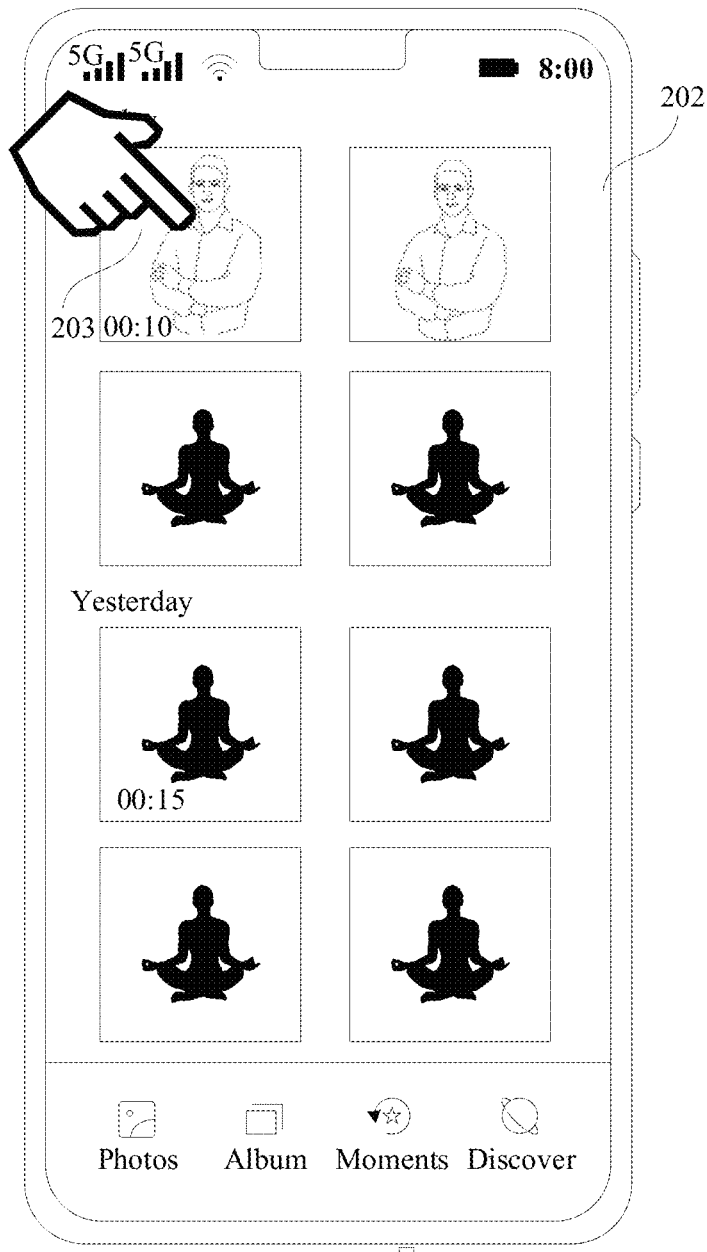
Figure 2:
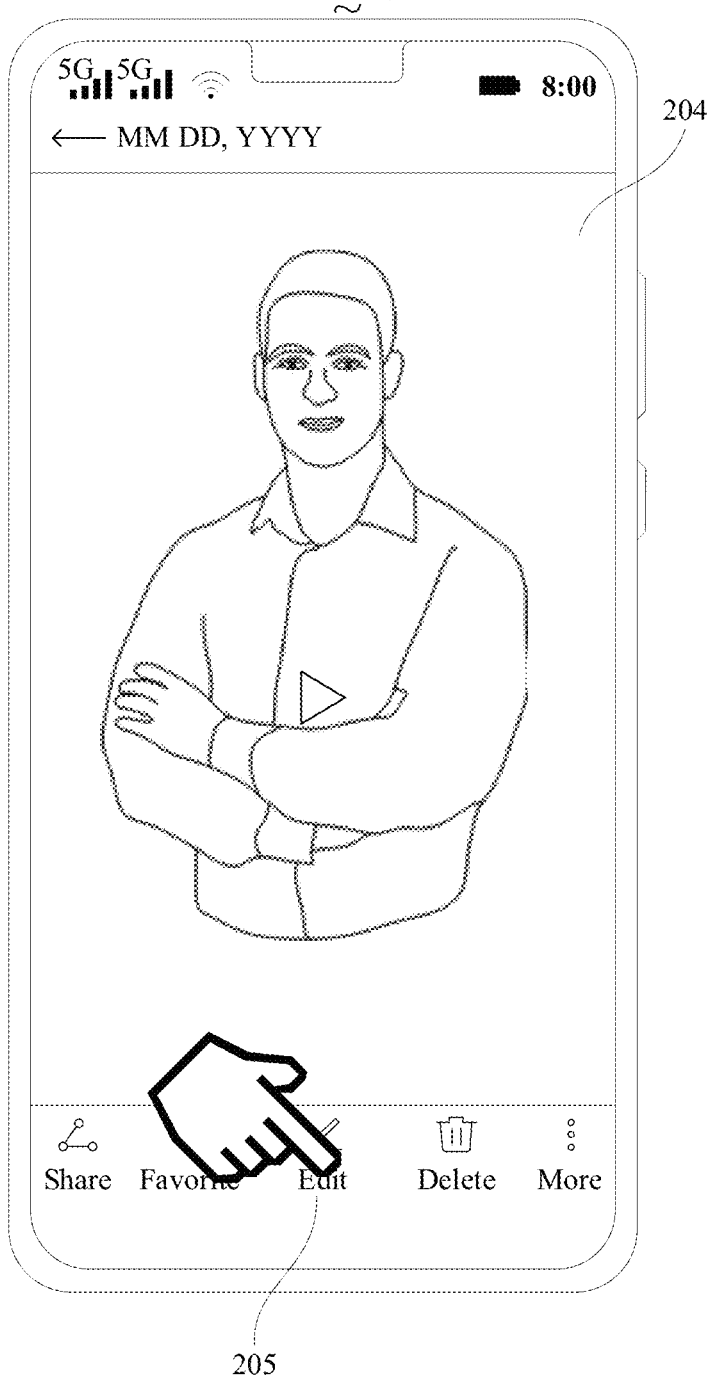
Figure 2:
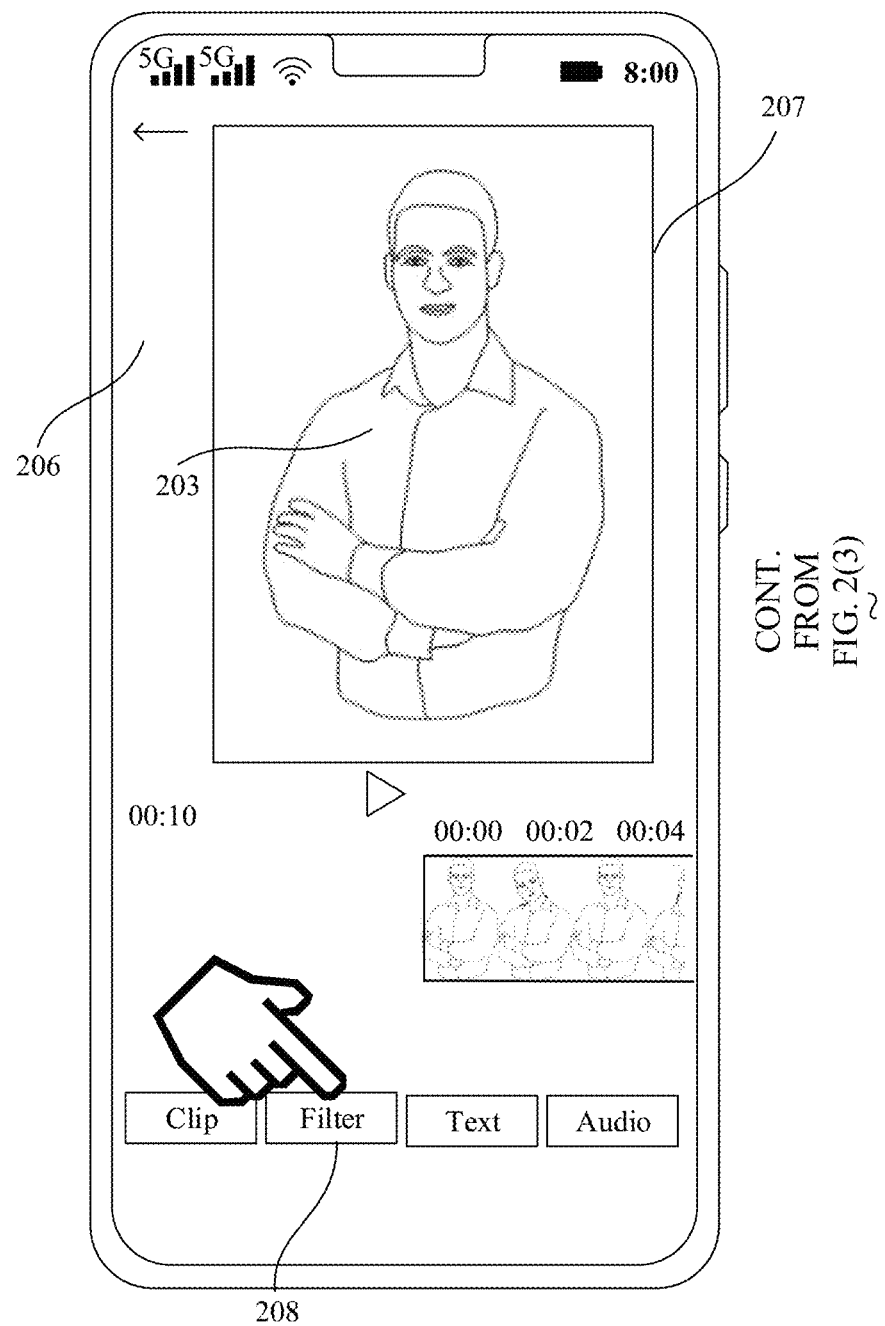
Figure 3:
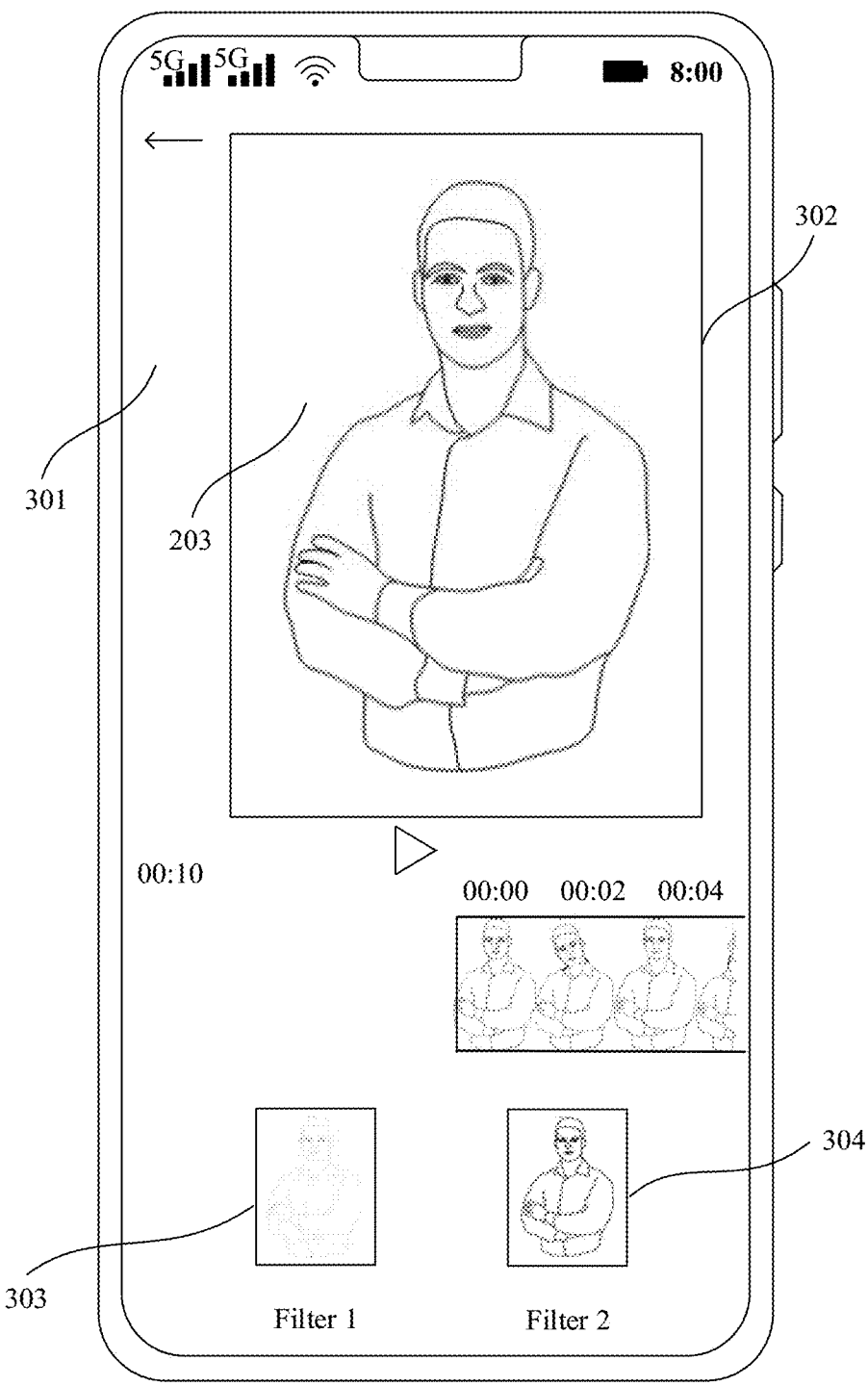
FIG. 3 is a schematic diagram of another video processing scenario according to an embodiment of this application.

In an actual application scenario, a mobile phone is used as an example of the electronic device for description. When a user needs to edit a target video, as shown in FIG. 2(1), FIG. 2(2), FIG. 2(3), and FIG. 2(4), after the user powers on the mobile phone, a display interface of the mobile phone displays a main screen of the mobile phone, as shown in FIG. 2(1). In response to that the user operates an icon 201 of a "Gallery" application on the main screen of the mobile phone, the mobile phone displays an interface 202 shown in FIG. 2(2). The interface 202 includes a target video 203, an image, and another video that are photographed by the mobile phone. In response to an operation of selecting the target video 203 by the user, the mobile phone displays an interface 204 shown in FIG. 2(3). The interface 204 is a playback interface of the target video 203. The interface 204 includes an edit control 205. In response to an operation of the user on the edit control 205, the mobile phone displays an interface 206 shown in FIG. 2(4). The interface 206 is an edition interface of the target video 203. The user operates the edit control 205, and the mobile phone enters the edition interface of the target video 203, to edit the target video 203. The interface 206 includes a preview box 207, and the target video 203 is displayed in the preview box 207. The interface 206 further includes a filter control 208. If the user wants to add a filter effect to the target video 203, the user may operate the filter control 208. In response to that the user operates the filter control 208, the mobile phone displays an interface 301 shown in FIG. 3. The interface 301 includes a preview box 302, a first window 303, and a second window 304. The target video 203 is displayed in the preview box 302, a first video image is displayed in the first window 303, and a second video image is displayed in the second window 304. The first video image is an image obtained after a first frame of video image of the target video 203 is rendered by using a filter 1, and the second video image is an image obtained after the first frame of video image of the target video 203 is rendered by using a filter 2.

It should be noted that the mobile phone includes a plurality of types of filters. In this example, only two types of filters are used as examples for description. A display window is correspondingly disposed in the interface 301 for each type of filter, and an image obtained after rendering is performed by using a corresponding filter is displayed in the display window. A quantity of filter types included in the mobile phone is not limited in embodiments of this application.

In the foregoing example, an image displayed in the first window 302 and an image displayed in the second window 303 are only filter effect pictures of different filter types of one frame of video image, but are not filter effects of a plurality of frames of video images of the target video. It cannot be determined, by using a frame of image displayed in the first window and a frame of image displayed in the second window, an overall filter effect of a specific filter used by the target video. If the user needs to view an overall filter effect of the target video, the user needs to apply the filter type to the target video to view the overall filter effect. In addition, an overall filter effect of only one filter type applied to the target video can be viewed at a time, and overall filter effects of a plurality of filter types applied to the target video cannot be viewed at the same time. In the foregoing manner, the user cannot intuitively observe a difference when different filters or special effects are applied to the video, and this is inconvenient for the user to make a choice, and user experience is reduced.

Therefore, in an embodiment of this application, a new video processing manner is provided. During edition of a video, m frames of video images obtained after a target video file is decoded are used as a first sampled video and a second sampled video, the first sampled video is rendered by using a first filter to obtain a first video, the second sampled video is rendered by using a second filter to obtain a second video, the first video is displayed in a first window, and the second video is displayed in a second window; at a first moment, an $i^{th}$ frame of video image of the first video is displayed in the first window, and an $i^{th}$ frame of video image of the second video is displayed in the second window; and at a second moment, an $(i+1)^{th}$ frame of video image of the first video is displayed in the first window, and an $(i+1)^{th}$ frame of video image of the second video is displayed in the second window. In this way, a video obtained after the target video file is decoded may be rendered by using different types of filters, and the video is displayed in a corresponding window, so that a user can intuitively observe a difference between different filters applied to the video obtained after the target video file is decoded, and therefore, the user can choose a required edition type, and user experience is improved.

Figure 4:
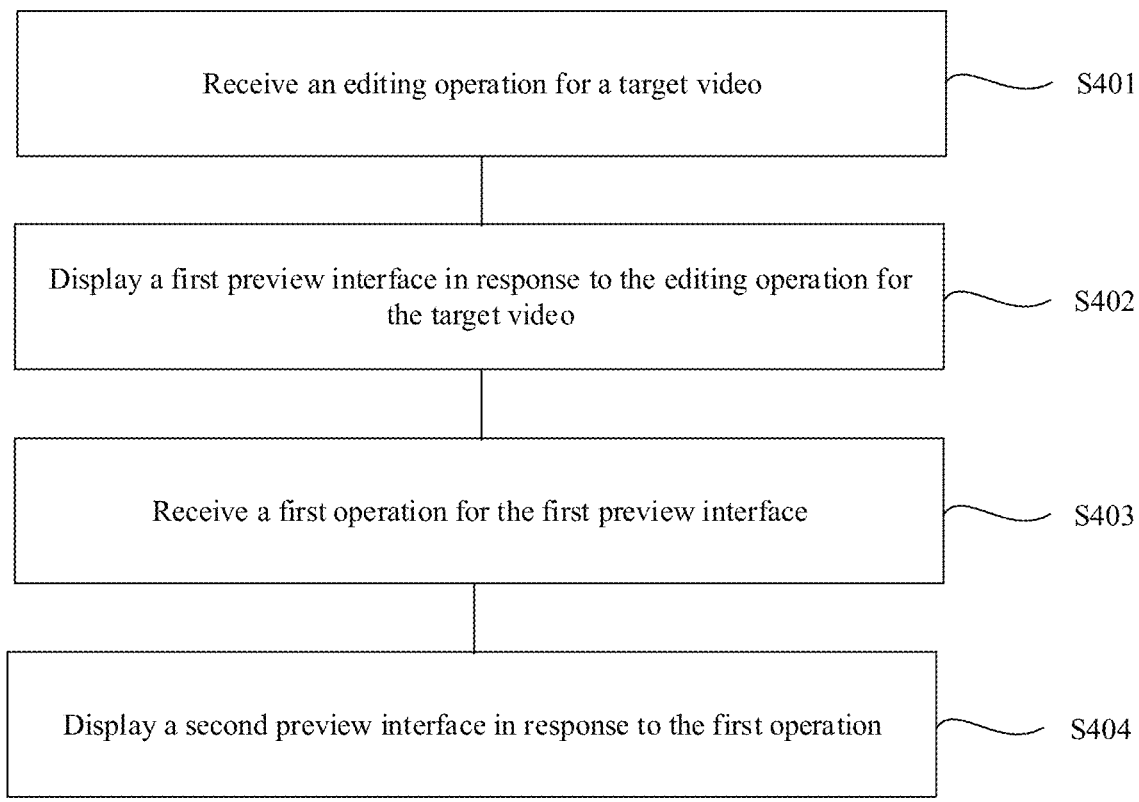
FIG. 4 is a schematic flowchart of a video processing method according to an embodiment of this application.

FIG. 4 is a schematic flowchart of a video processing method according to an embodiment of the present invention. The method is applied to an electronic device. As shown in FIG. 4, the method includes the following steps.

Step S401: Receive an editing operation for a target video.

In this embodiment of this application, generally, when a user plays a video on the electronic device, for fun or to beautify the video, a filter effect may be added to the target video. For example, video content is a person, and to beautify photographed video content, the photographed video may be superimposed with a filter effect of blurring a background, so that a photographed person can be highlighted. Alternatively, video content is a person a who is singing. For fun, photographed video content may be added with a filter effect of dynamic stroboflash, to achieve an effect of simulating a concert.

The user searches a Gallery application of the electronic device for thumbnails of a video and a photographed image that are stored in the Gallery application. A video selected by the user is determined as the target video. In this case, when the user selects a thumbnail of the required video, the electronic device may find a corresponding target video file for the thumbnail, and decodes the target video file to obtain the required target video. When the user needs to edit the target video, the user may send an editing operation for the target video to the electronic device. In this case, the electronic device may receive the editing operation for the target video.

Step S402: Display a first preview interface in response to the editing operation for the target video.

The first preview interface includes a preview box. The target video is displayed in the preview box, and the target video is a video obtained after the target video file is decoded.

In this embodiment of this application, after receiving the editing operation for the target video, a mobile phone displays a preview interface for editing the target video, that is, the first preview interface. The first preview interface includes the preview box, and the target video is displayed in the preview box.

It should be noted that the video is a continuous image sequence and includes continuous frames of video images, and one frame of video image is one image. Due to a visual pause effect of a human eye, when frames of video images of a frame sequence are played at a specific rate, the user can watch a continuous video. Because continuous frames of video images are highly similar, to facilitate storage and transmission, the electronic device may encode an original video to obtain a video file, to remove redundancy in space and time dimensions and reduce storage space occupied by the video. Therefore, when the video needs to be played, the electronic device decodes the video file to obtain the required video.

Step S403: Receive a first operation for the first preview interface.

The first operation is an operation of enabling a filter function.

In this embodiment of this application, after the first preview interface is displayed, the electronic device further includes a filter control in the first preview interface. When the user needs to add a filter effect to the target video, the user may send the first operation to the first preview interface. The electronic device receives the first operation for the first preview interface.

Step S404: Display a second preview interface in response to the first operation.

The second preview interface includes a preview box, a first window, and a second window. At a first moment, the target video is displayed in the preview box, an $i^{th}$ frame of video image of the first video is displayed in the first window, an $i^{th}$ frame of video image of the second video is displayed in the second window, the first video is a video obtained after a first sampled video is rendered by using a first filter, the first video includes m frames of video images, the second video is a video obtained after a second sampled video is rendered by using a second filter, the second video includes m frames of video images, both the first sampled video and the second sampled video are videos formed by sampling m frames of video images from the video obtained after the target video file is decoded, i is an integer greater than 0 and less than m, and m is an integer greater than 1.

At a second moment, the target video is displayed in the preview box, an $(i+1)^{th}$ frame of video image of the first video is displayed in the first window, and an $(i+1)^{th}$ frame of video image of the second video is displayed the second window.

In this embodiment of this application, when editing the target video, the user enters an edition preview interface, that is, the first preview interface. To add a filter effect to the target video, the electronic device may enable the filter function after receiving the first operation for enabling the filter function, and display the second preview interface on a display.

The second preview interface includes a preview box, a first window, and a second window. Video images displayed in the first window and the second window are video images in a video obtained after a sampled video obtained after the target video file is decoded is rendered by using a filter. A video image in the first video is displayed in the first window, a video image in the second video is displayed in the second window, and the first video and the second video each include at least two frames of video images. Therefore, at least two frames of video images are displayed in the first window and the second window. In other words, at the first moment, the target video is displayed in the preview box, the $i^{th}$ frame of video image of the first video is displayed in the first window, and the $i^{th}$ frame of video image of the second video is displayed the second window. The first video is a video obtained after the first sampled video is rendered by using the first filter, and the first video includes m frames of video images. The second video is a video obtained after the second sampled video is rendered by using the second filter, and the second video includes m frames of video images. Both the first sampled video and the second sampled video are videos formed by sampling m frames of video images in the video obtained after the target video file is decoded. i is an integer greater than 0 and less than m. At the second moment, the target video is displayed in the preview box, the $(i+1)^{th}$ frame of video image of the first video is displayed in the first window, and the $(i+1)^{th}$ frame of video image of the second video is displayed the second window. In other words, the first video is displayed in the first window, and the second video is displayed in the second window.

It should be noted that, that the first video is displayed in the first window and the second video is displayed in the second window is: The electronic device displays, in the first window, frames of video images in the first video in sequence based on a frame sequence of video images in the first video, and displays, in the second window, frames of video images in the second video in sequence based on a frame sequence of video images in the second video.

It should be noted that the electronic device may include at least one, two, or more types of filters, and a quantity of windows that display a video image of a filter rendering effect in the preview interface of the electronic device is the same as a quantity of filter types included in the electronic device. Each window corresponds to one filter type. A video displayed in each window is a video obtained after a sampled video is rendered by using a filter based on a filter type corresponding to the window. Filter rendering effects of videos displayed in different windows are different. A video obtained after only one type of filter rendering effect is displayed in each window. In this embodiment of this application, as an example for description, the electronic device includes a first filter and a second filter. In this case, two windows are displayed in the preview interface of the electronic device, that is, the first window and the second window. The first video obtained after the first sampled video is rendered by using the first filter is displayed in the first window. The video obtained after the second sampled video is rendered by using the second filter is displayed in the second window. A quantity of filter types included in the electronic device is not limited in this embodiment of this application.

In this embodiment of this application, as an example, the electronic device is a mobile phone, and the mobile phone includes two types of filters. When the user needs to edit the target video, the user may enter an editing interface of the target video, as shown in FIG. 2(1), FIG. 2(2), FIG. 2(3), and FIG. 2(4). The editing interface of the target video includes a filter control 208. If the user needs to add a filter effect to the target video, in response to that the user operates the filter control 208, the mobile phone displays an interface 501 shown in FIG. 5(1). The interface 501 includes a preview box 502, a first window 503, and a second window 504. A target video 203 is displayed in the preview box 502, a first video is displayed in the first window 503, and a second video is displayed in the second window 504. The first video is a video obtained after the first sampled video is rendered by using the first filter, and the second video is a video obtained after the second sampled video is rendered by using the second filter. Both the first sampled video and the second sampled video are videos formed by sampling m frames of video images from the video obtained after the target video file is decoded. When the mobile phone displays the interface 501, the first video and the second video are automatically played in both the first window 503 and the second window 504. It is assumed that the first video and the second video each include three frames of video images. That the first video and the second video are automatically played in both the first window and the second window is specifically: In response to that the user operates the filter control 208, the mobile phone displays the interface 501 shown in FIG. 5(1), and the interface 501 includes the preview box 502, the first window 503, and the second window 504. At a first moment, a first frame of video image 505 of the first video is displayed in the first window 503 in the interface 501, and a first frame of video image 506 of the second video is displayed in the second window 504. At a second moment, as shown in an interface 507 shown in FIG. 5(2), the interface 507 includes a preview box 502, a first window 503, and a second window 54. A second frame of video image 508 of the first video is displayed in the first window 503, and a second frame of video image 509 of the second video is displayed in the second window 504. At a third moment, as shown in an interface 510 shown in FIG. 5(3), the interface 506 includes a preview box 502, a first window 503, and a second window 54. A third frame of video image 511 of the first video is displayed in the first window 503, and a third frame of video image 512 of the second video is displayed in the second window 504.

It should be noted that in the foregoing example, the mobile phone includes two types of filters. Therefore, the interface 501, the interface 507, and the interface 510 each include the first window 503 and the second window 504. A video obtained after rendering processing of the first filter is correspondingly displayed in the first window 503, and a rendering processing obtained after rendering processing of the second filter is correspondingly displayed in the second window 504. If the mobile phone includes three or more types of filters, a corresponding quantity of windows are included in the interface 501, the interface 507, and the interface 510, and a video obtained after rendering processing of only one type of filter is displayed in each window.

Further, display sizes of the first window and the second window are the same. In this application, to provide a better visual effect for the user to make a display interface neat, the display sizes of the first window and the second window that are displayed in the preview interface may be set to a same size.

Further, to not affect a display effect of the preview box, the display sizes of the first window and the second window are less than a display size of the preview box.

Further, the displaying a first video in the first window includes: cyclically displaying the first video in the first window; and the displaying a second video in the second window includes: cyclically displaying the second video in the second window.

In this embodiment of this application, because the first video and the second video include m frames of video images, after the m frames of video images of the first video are displayed in the first window, the first video may be re-displayed; in other words, a first frame of video image to an $m^{th}$ frame of video image of the first video are re-displayed in the first window based on a time sequence of frames of video images in the first video. Similarly, after m frames of video images of the second video are displayed in the second window, the second video may be re-displayed; in other words, a first frame of video image to an mth frame of video image of the second video are re-displayed in the second window based on a time sequence of frames of video images in the second video. In this way, in the second preview interface of the electronic device, the first video is cyclically displayed in the first window, and the second video is cyclically displayed in the second window, so that the user can watch, at any time, the first video displayed in the first window and the second video displayed in the second window, so that user experience is improved.

Figure 5:
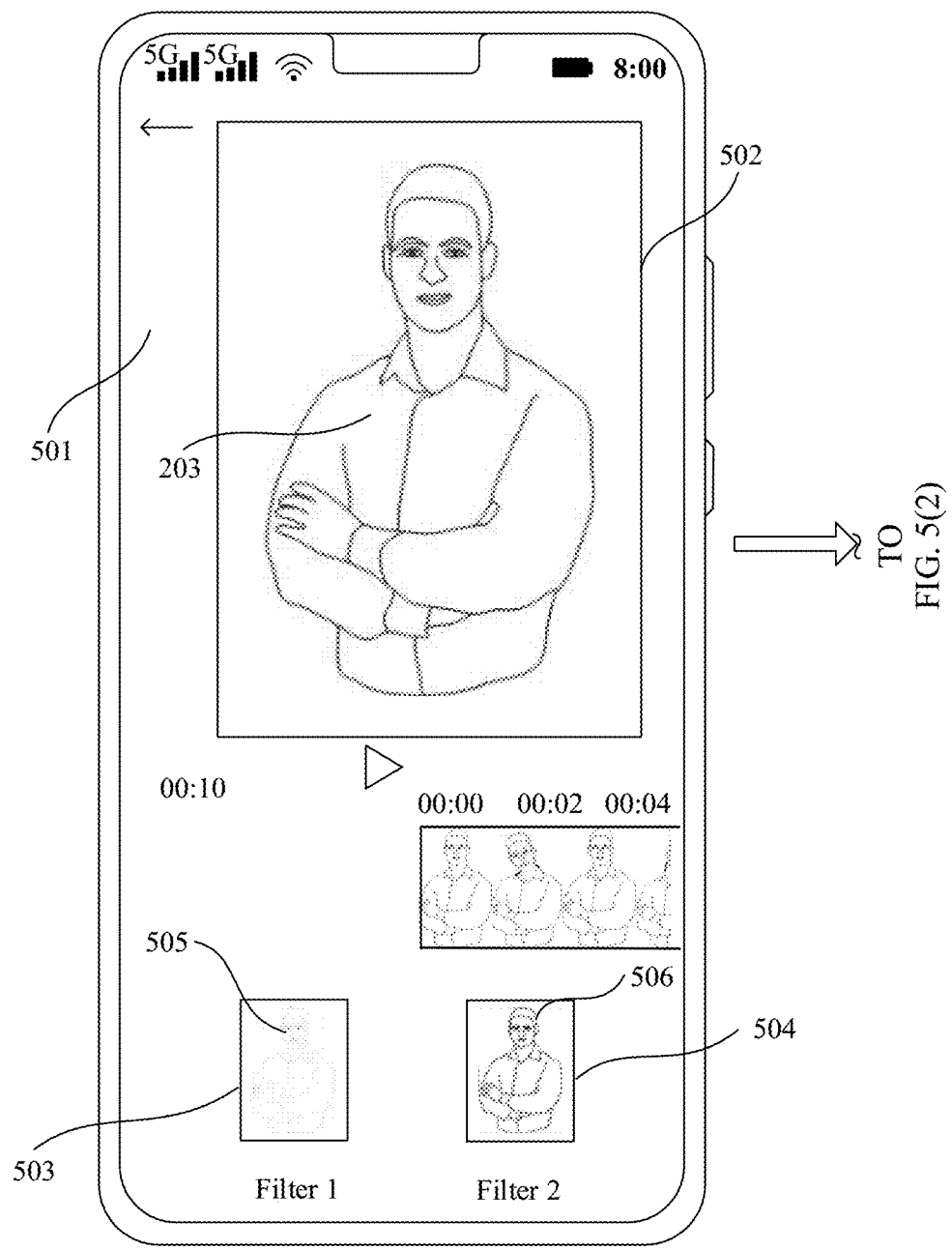
FIG. 5(1), FIG. 5(2), FIG. 5(3), and FIG. 5(4) are a schematic diagram of another video processing scenario according to an embodiment of this application.
Figure 5:
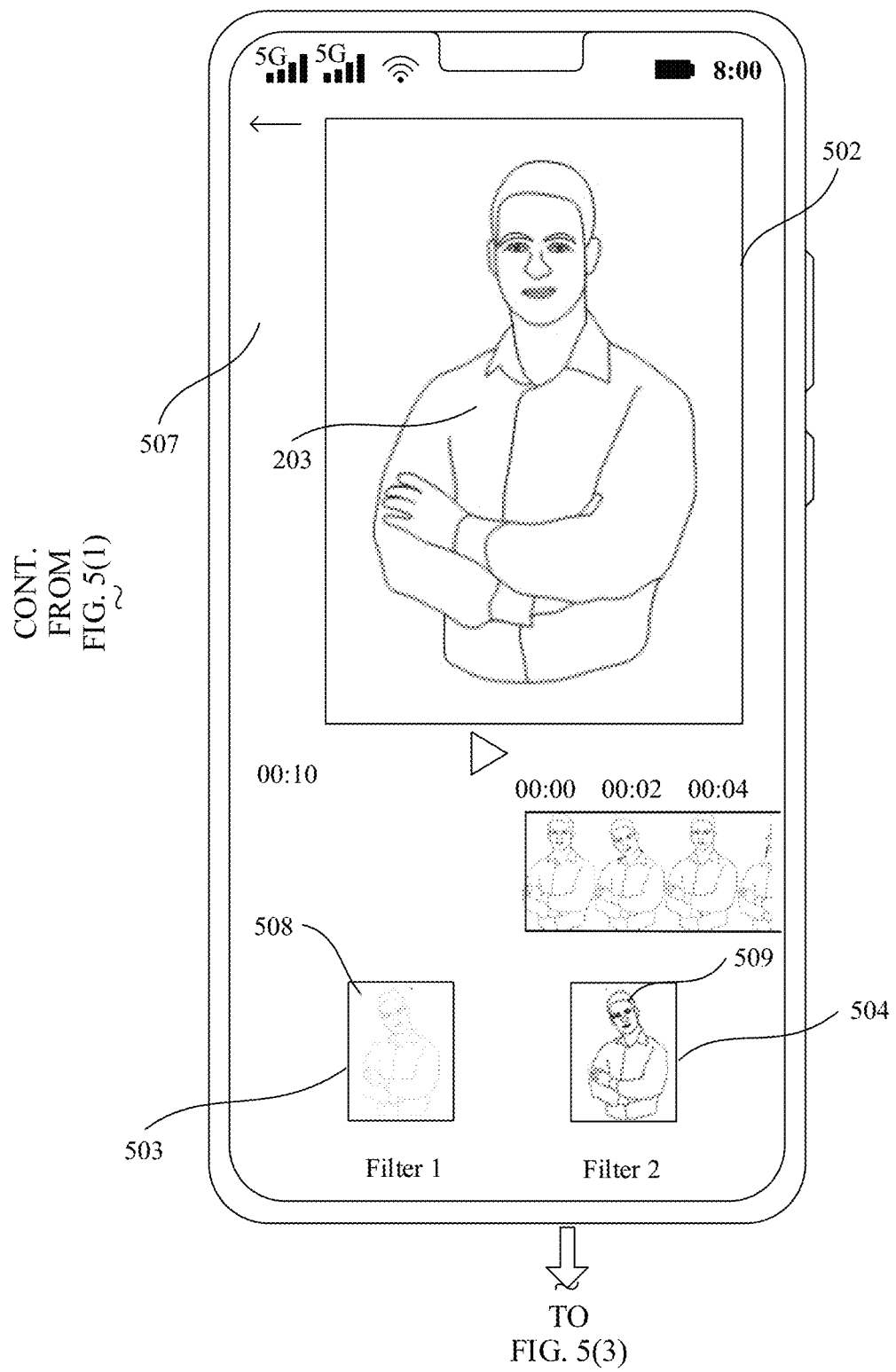
Figure 5:
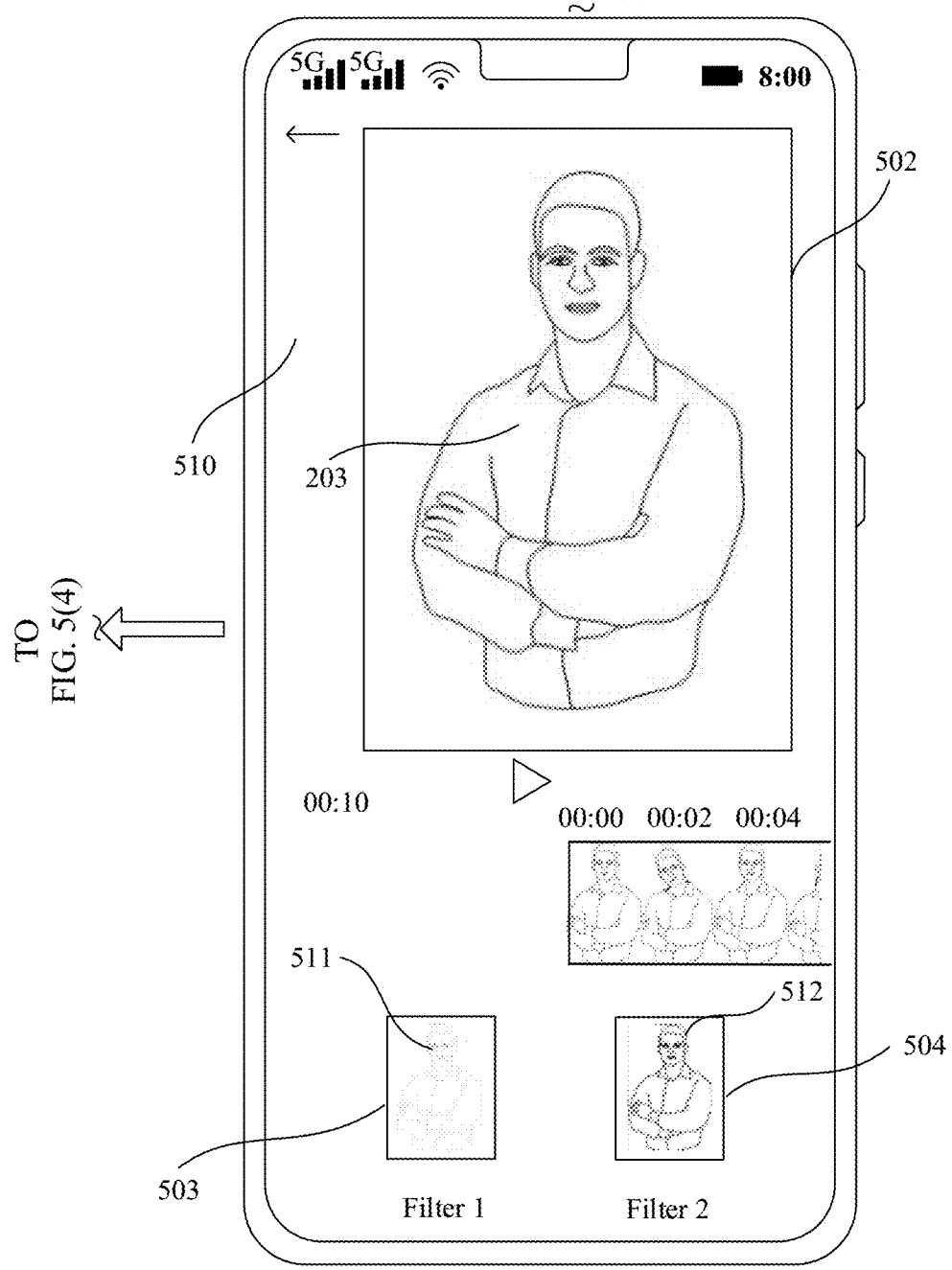
Figure 5:
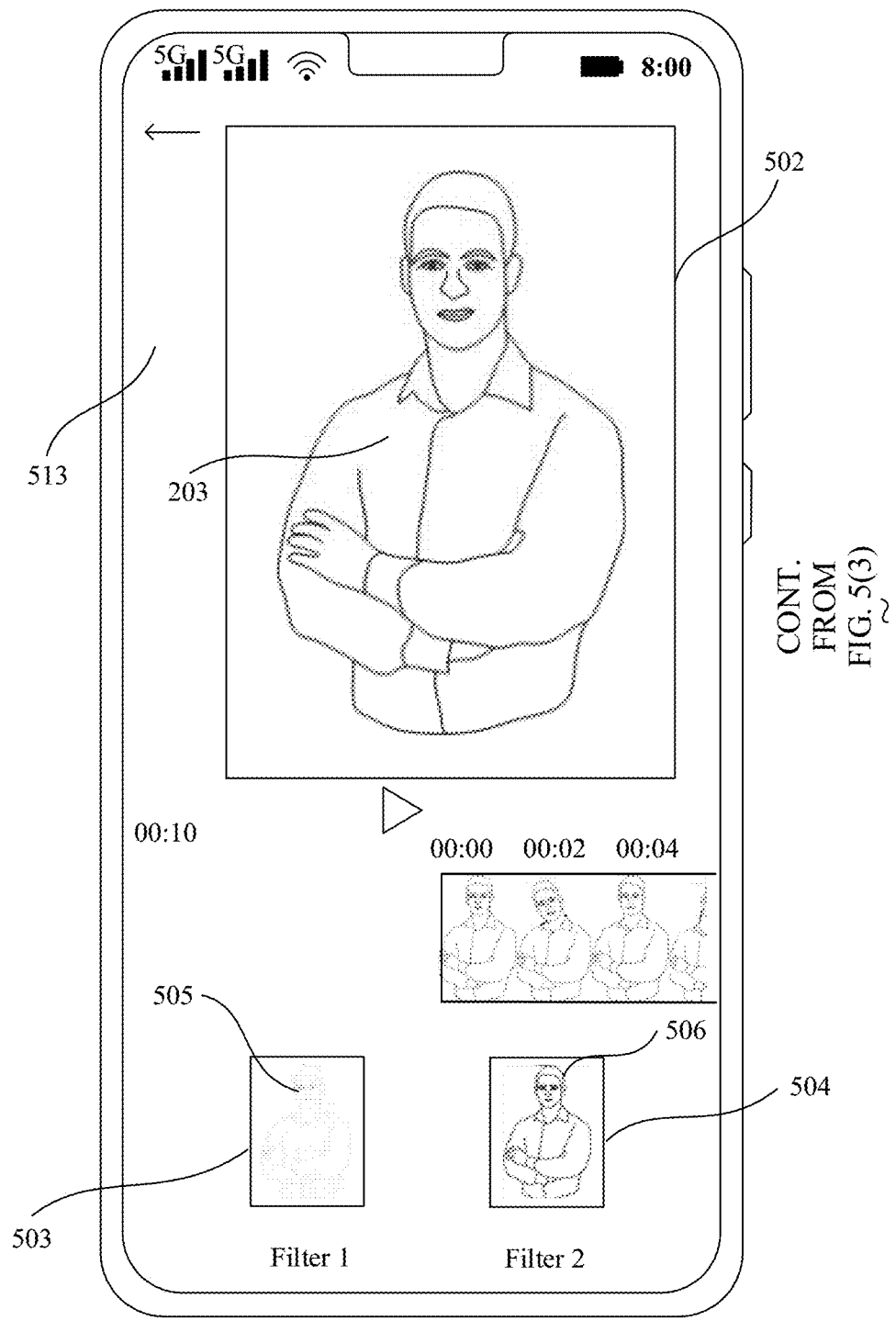

In some embodiments, if the first video includes three frames of video images and the second video includes three frames of video images, with reference to the interface 510 shown in FIG. 5(3), a third frame of video image 511 of the first video is displayed in the first window 503 in the interface 510, and a third frame of video image 512 of the second video is displayed in the second window 504. At a next moment, as shown in an interface 513 shown in FIG. 5(4), the interface 513 includes a preview box 502, a first window 503, and a second window 504. The first frame of video image 505 of the first video is displayed in the first window 503, and the first frame of video image 506 of the second video is displayed in the second window 504.

In some embodiments, that both the first sampled video and the second sampled video are videos formed by sampling m frames of video images from the video obtained after the target video file is decoded includes: decoding the target video file once to obtain a third video, and sampling m frames of video images in the third video to form the first sampled video and the second sampled video respectively.

Figure 6:
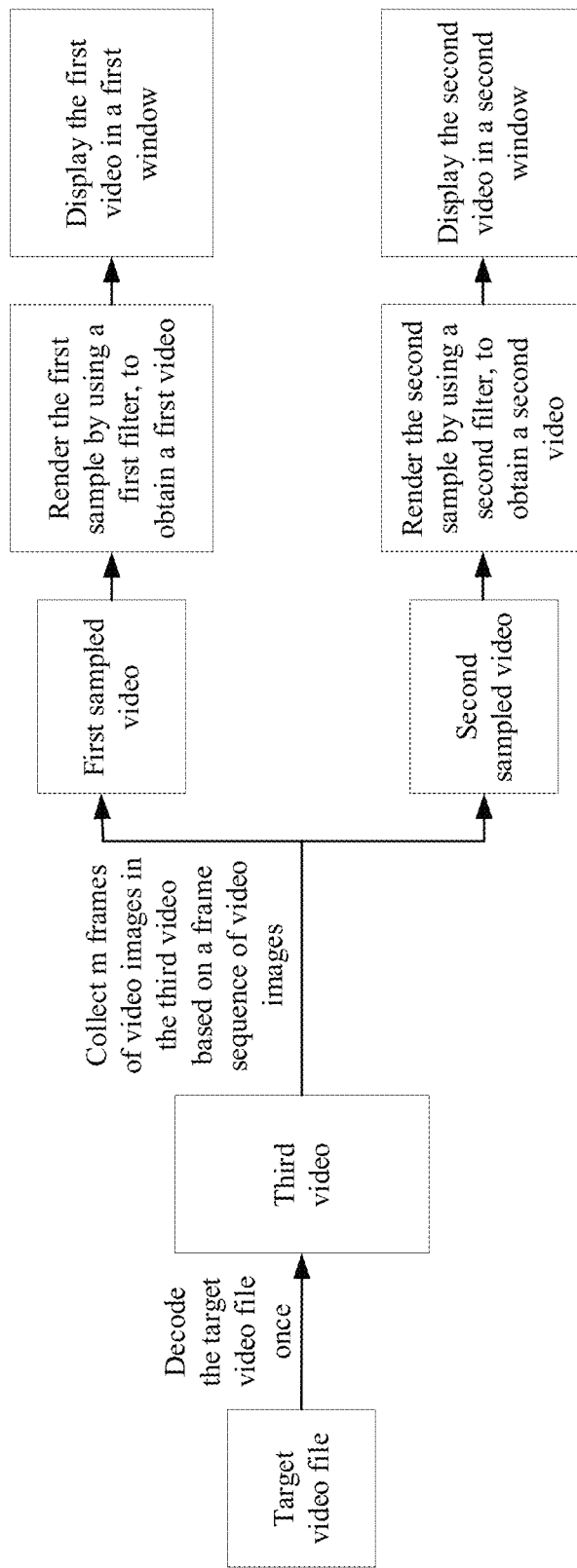
FIG. 6 is a schematic flowchart of another video processing method according to an embodiment of this application.

In this embodiment of this application, both the first sampled video and the second sampled video are obtained through sampling from the video obtained after the target video file is decoded. To avoid redundant overheads of repeated decoding, the electronic device may decode the target video file once to obtain a decoded third video and a frame sequence of frames of video images included in the third video. The electronic device samples m frames of video images in the third video based on the frame sequence of the video images, and uses the sampled m frames of video images as video images in the first sampled video and the second sampled video to form the first sampled video and the second sampled video. The electronic device renders the first sampled video by using the first filter, to form the first video, and cyclically displays the first video in the first window; and renders the second sampled video by using the second filter, to form the second video, and cyclically displays the second video in the second window, as shown in FIG. 6.

It should be noted that the third video is a video obtained by directly decoding the target video file, and is the same as the target video.

Further, the electronic device may directly use the third video as the first sampled video and a second sample, and in this case, a value of m is a quantity of frames of video images included in the third video.

In this case, after obtaining the third video through decoding, the electronic device may directly use the third video as the first sampled video and the second sampled video, renders the third video by using the first filter and displays the third video in the first window, and renders the second sampled video by using the second filter and display the second sampled video in the second window.

Alternatively, the electronic device samples m frames of video images in the third video, and a value of m is less than a quantity of frames of video images included in the third video. The sampled m frames of video images are used as video images in the first sampled video and the second sampled video to form the first sampled video and the second sampled video.

Display sizes of both the first window and the second window in the second preview interface are less than a display size of the preview box, and content of preview images between two adjacent frames is highly similar. If a quantity of frames of images displayed in the first window and the second window per second is reduced, the user can hardly experience a difference, and resource loss of the electronic device can be reduced, and a processing speed of the electronic device can be improved. Therefore, the electronic device may sample one frame of video image in every n frames of video images in the third video based on a frame sequence of video images included in the third video, and sample m frames of video image in the third video in this manner, to form the first sampled video and the second sampled video; render the third video by using the first filter, and display the third video in the first window; and render the second sampled video by using the second filter, and display the second sampled video in the second window.

In some embodiments, the sampling m frames of video images in the third video to form the first sampled video and the second sampled video respectively includes: sampling m frames of video images in the third video in a manner in which one frame of video image is sampled from every three frames of video images, to form the first sampled video and the second sampled video respectively.

In other words, the electronic device may sample one frame of video image in every three frames of video images in the third video based on the frame sequence of the video images included in the third video, and sample m frames of video images in the third video in this manner, to form the first sampled video and the second sampled video. In this case, video images obtained after rendering processing of the first filter, such as a first frame of video image, a fourth frame of video image, and a seventh frame of video image of the third video, are displayed in the first window, and video images obtained after rendering processing of the second filter, such as the first frame of video image, the fourth frame of video image, and the seventh frame of video image of the third video, are displayed in the second window.

In some embodiments, the third video is the same as the target video. It is assumed that the third video and the target video include 10 frames of video images, one frame of video image is extracted from every three frames in the third video to form the first sampled video and the second sampled video. In other words, the first sampled video and the second sampled video each include the first frame of video image, the fourth frame of video image, the seventh frame of video image, and a tenth frame of video image of the third video. The first sampled video is rendered by using the first filter to obtain the first video, and the second sampled video is rendered by using the second filter to obtain the second video. The first video is displayed in the first window, and the second video is displayed in the second window. As shown in FIG. 7a(1), FIG. 7a(2), FIG. 7a(3), and FIG. 7a(4) and FIG. 7b(1), FIG. 7b(2), and FIG. 7b(3), the mobile phone displays an interface 701 shown in FIG. 7a(1). The interface 701 includes a preview box 702. The target video is displayed in the preview box 702. The interface 701 further includes a filter control 703. If the user wants to add a filter effect to the target video, the user may operate the filter control 703. In response to that the user operates the filter control 703, the mobile phone displays an interface 704 shown in FIG. 7a(2). The interface 704 includes a preview box 702, a first window 705, a second window 706, and a play control 707. The target video is displayed in the preview box 702, and in this case, only a first frame of video image 708 of the target video is displayed in the preview box 702. When the user has not operated the play control 707, only the first frame of video image 708 of the target video is displayed in the preview box 702, and another video image of the target video is not displayed. For this case, refer to FIG. 5(1), FIG. 5(2), FIG. 5(3), and FIG. 5(4). Details are not described herein. A first frame of video image 709 of the first video is displayed in the first window 705, and a first frame of video image 710 of the second video is displayed in the second window 707. In response to an operation performed by the user on the play control 707, the mobile phone displays an interface 711 shown in FIG. 7a(3), and the interface 711 includes a preview box 702, a first window 705, and a second window 706. A second frame of video image 712 of the target video is displayed in the preview box 702, a second frame of video image 713 of the first video is displayed in the first window 705, and a second frame of video image 714 of the second video is displayed in the second window 707. At a next moment, as shown in an interface 715 shown in FIG. 7a(4), the interface 715 includes a preview box 702, a first window 705, and a second window 706. A third frame of video image 716 of the target video is displayed in the preview box 702, a third frame of video image 717 of the first video is displayed in the first window 705, and a third frame of video image 718 of the second video is displayed in the second window 707. At a next moment, as shown in an interface 719 shown in FIG. 7b(1), the interface 719 includes a preview box 702, a first window 705, and a second window 706. A fourth frame of video image 720 of the target video is displayed in the preview box 702, a fourth frame of video image 721 of the first video is displayed in the first window 705, and a fourth frame of video image 722 of the second video is displayed in the second window 707. At a next moment, as shown in an interface 723 shown in FIG. 7b(2), the interface 723 includes a preview box 702, a first window 705, and a second window 706. A fifth frame of video image 724 of the target video is displayed in the preview box 702, the first frame of video image 709 of the first video is displayed in the first window 705, and the first frame of video image 710 of the second video is displayed in the second window 707. At a next moment, as shown in an interface 725 shown in FIG. 7b(3), the interface 725 includes a preview box 702, a first window 705, and a second window 706. A sixth frame of video image 726 of the target video is displayed in the preview box 702, the first frame of video image 713 of the first video is displayed in the first window 705, and the first frame of video image 714 of the second video is displayed in the second window 707. In other words, in the mobile phone, the first video is cyclically displayed in the first window 705, and the second video is cyclically displayed in the second window 706. The target video displayed in the preview box is a video that is not rendered by using a filter.

In some embodiments, in the second preview interface, resolution of the first video and resolution of the second video are less than resolution of the target video.

To not affect display of the target video, sizes of the first window and the second window in the second preview interface are less than a size of the preview box. Based on that the electronic device displays video images in a video frame by frame, content of video images between two adjacent frames is highly similar, and display space of the first window and display space of the second window are relatively small, so that resolution of the videos displayed in the first window and the second window can be reduced; in other words, the resolution of the first video and the resolution of the second video can be reduced, that is, display details of the first video and the second video can be reduced. Because the display space of the first window and the display space of the second window are relatively small, even if the resolution of the first video and the resolution of the second video are reduced, the user can hardly experience a difference, and resource loss of the electronic device can be reduced, and a processing speed of the electronic device can be improved. Therefore, the electronic device may adjust the resolution of the first video and the resolution of the second video based on the sizes of the first window and the second window. For example, the resolution of the target video displayed in the preview box is 1080*720. The electronic device may adjust the resolution of the first video displayed in the first window and the resolution of the second video displayed in the second window to 325*288.

In some embodiments, as shown in FIG. 5(1), the mobile phone displays the interface 501 shown in FIG. 5(1), and the interface 501 includes a preview box 502, a first window 503, and a second window 504. A target video 203 is displayed in the preview box 502, a first video is displayed in the first window 503, and a second video is displayed in the second window 504. When displaying the first video and the second video, the electronic device may first reduce resolution of the first video and resolution of the second video, and after reducing the resolution of the first video and the resolution of the second video, display the first video in the first window 503, and display the second video in the second window 504.

It should be noted that resolution adjustment by the electronic device may be a value preset for adjustment based on an actual requirement. This is not limited in this application.

It should be noted that resolution of a video is resolution of a video image included in the video, and the resolution of the video image is width and height pixel values of the video image. The resolution of the video image is a parameter used to measure an amount of data in the video image, and is usually represented as pixels per inch. If resolution of a video image A is 3200*180, it indicates valid pixels in a horizontal direction and a vertical direction. When a size of a display area is small, a pixel value per inch is relatively high, and the video image A looks clear. When the size of the display area is large, because there are not excessive valid pixels to fill in the display area, a pixel value per inch of the valid pixel decreases, and the video image A is blurred during displaying. In this embodiment of this application, the electronic device may reduce the resolution of the first video and the resolution of the second video by reducing valid pixels of video images in the first video and the second video.

Figure 8:
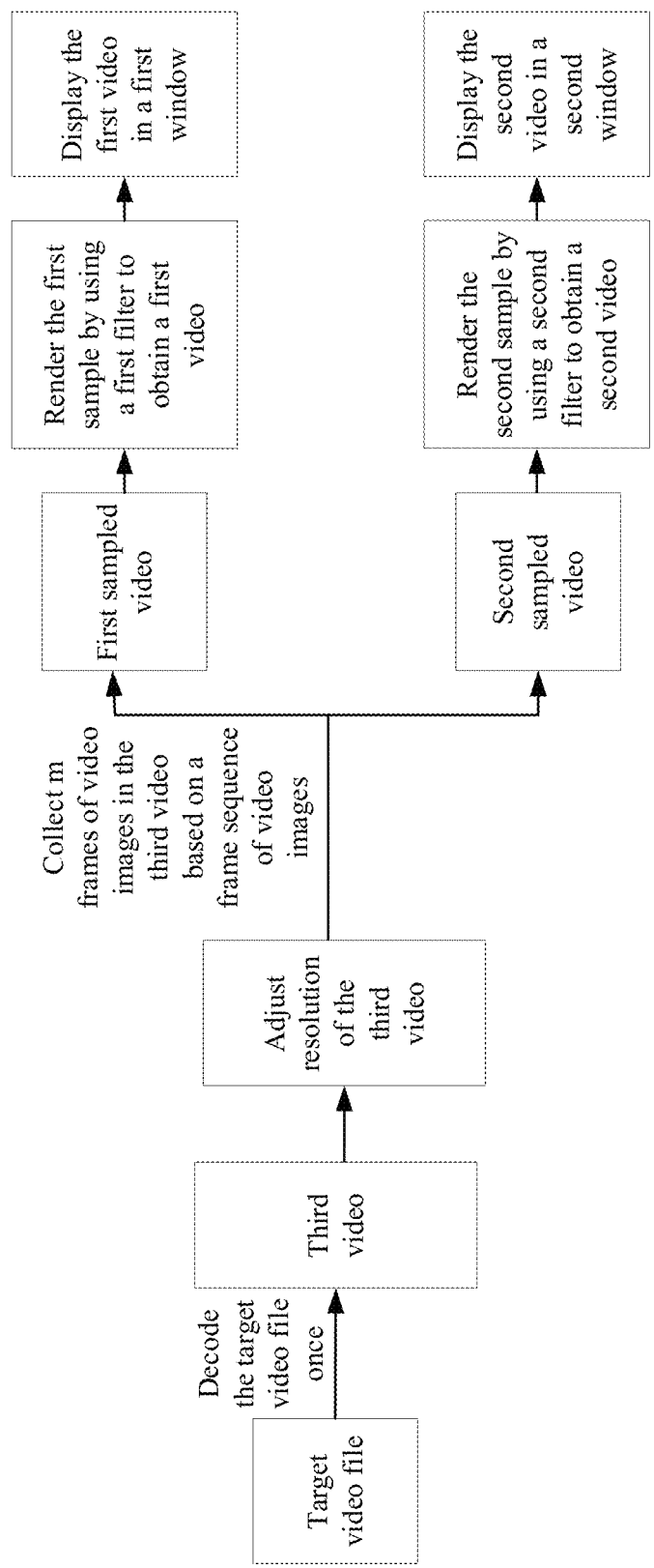
FIG. 8 is a schematic flowchart of another video processing method according to an embodiment of this application.

It should be noted that the electronic device may adjust the resolution of the first video and the resolution of the second video by adjusting resolution of the first sampled video and resolution of the second sampled video, or certainly, may directly adjust the resolution of the first video and the resolution of the second video by adjusting resolution of the third video, as shown in FIG. 8. Alternatively, the resolution of the first video and the resolution of the second video may be directly adjusted. This is not limited in this application.

In some embodiments, a frame rate at which the first video is displayed in the first window and a frame rate at which the second video is displayed in the second window are the same as a frame rate at which the target video is displayed in the preview box.

For ease of implementation, the frame rate at which the target video is displayed in the preview box may be set to be equal to the frame rate at which the first video is displayed in the first window and the frame rate at which the second video is displayed in the second window. In other words, a quantity of frames of video images of the target video displayed in the preview box per second is equal to a quantity of frames video images of the first video displayed in the first window per second and a quantity of frames video images of the second video displayed in the second window per second. For example, if 30 frames of video images of the target video are displayed in the preview box per second, 30 frames of video images of the first video are also displayed in the first window per second, and 30 frames of video images of the second video are also displayed in the second window per second. In other words, an image refresh frequency in the preview box is the same as an image refresh frequency in the first window and an image refresh frequency in the second window, as shown in FIG. 7a(1), FIG. 7a(2), FIG. 7a(3), and FIG. 7a(4) and FIG. 7b(1), FIG. 7b(2), and FIG. 7b(3). In this way, the electronic device may render the sampled first sampled video by using the first filter, to form the first video, and display the first video in the first window, and render the sampled second sampled video by using the second filter, to form the second video, and display the second video in the second window. This is simple to implement.

Alternatively, because the display size of the first window and the display size of the second window are less than the display size of the preview box, when a frame rate of the first video and a frame rate of the second video are the same as a frame rate of the target video, because a playback speed of the video is relatively fast and the display size of the first window and the display size of the second window are relatively small, the user cannot easily clearly watch the first video displayed in the first window and the second video displayed in the second window. To make it convenient for the user to clearly watch the first video and the second video, the frame rate at which the first video is displayed in the first window and the frame rate at which the second video is displayed in the second window may be reduced. In other words, a quantity of frames of video images of the first video displayed in the first window per second and a quantity of frames of video images of the second video displayed in the second window per second are reduced.

In some embodiments, the frame rate at which the target video is displayed in the preview box is three times the frame rate at which the first video is displayed in the first window and the frame rate at which the second video is displayed in the second window.

Figure 9:
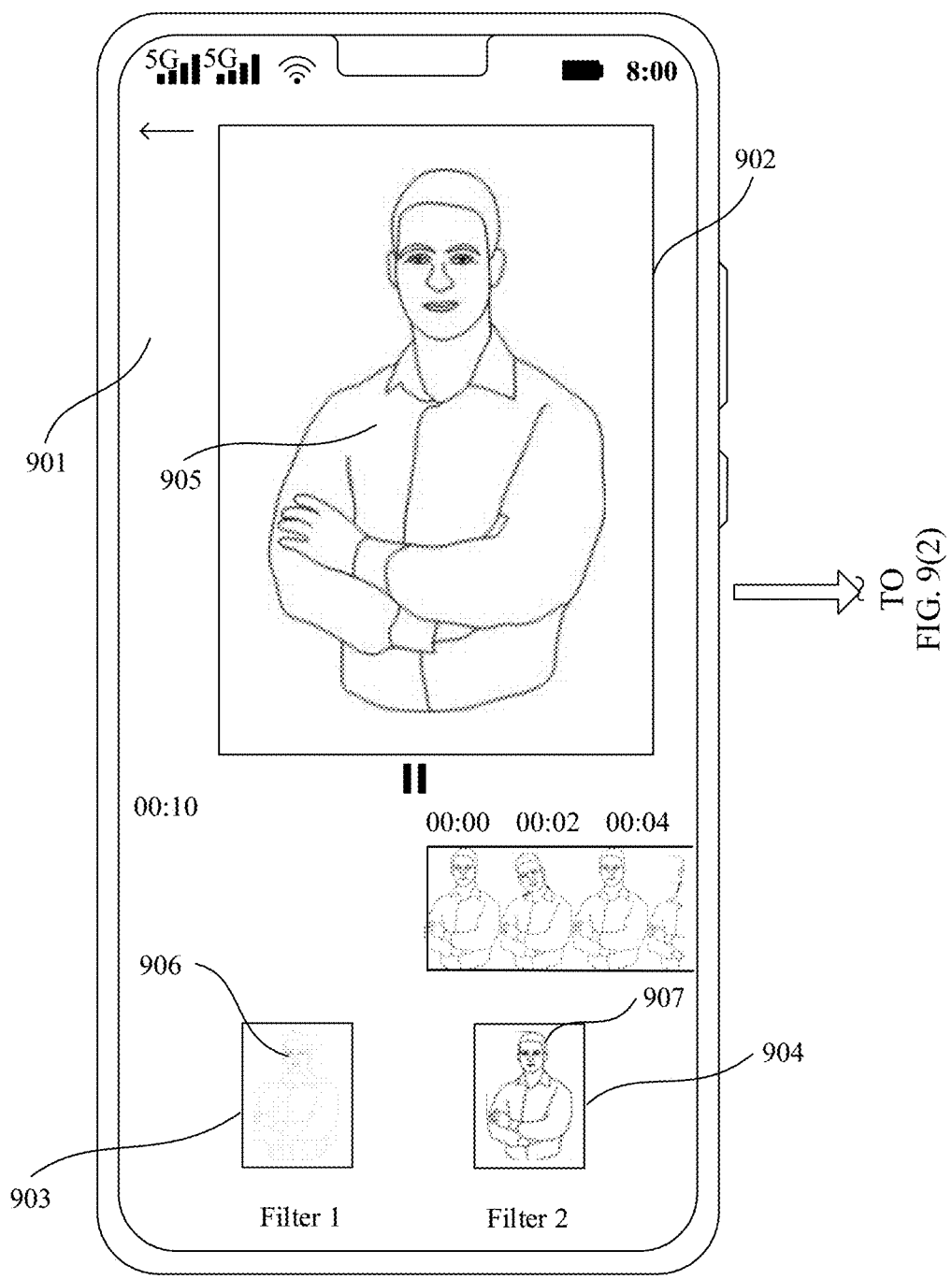
FIG. 9(1), FIG. 9(2), FIG. 9(3), and FIG. 9(4) are a schematic diagram of another video processing scenario according to an embodiment of this application.
Figure 9:
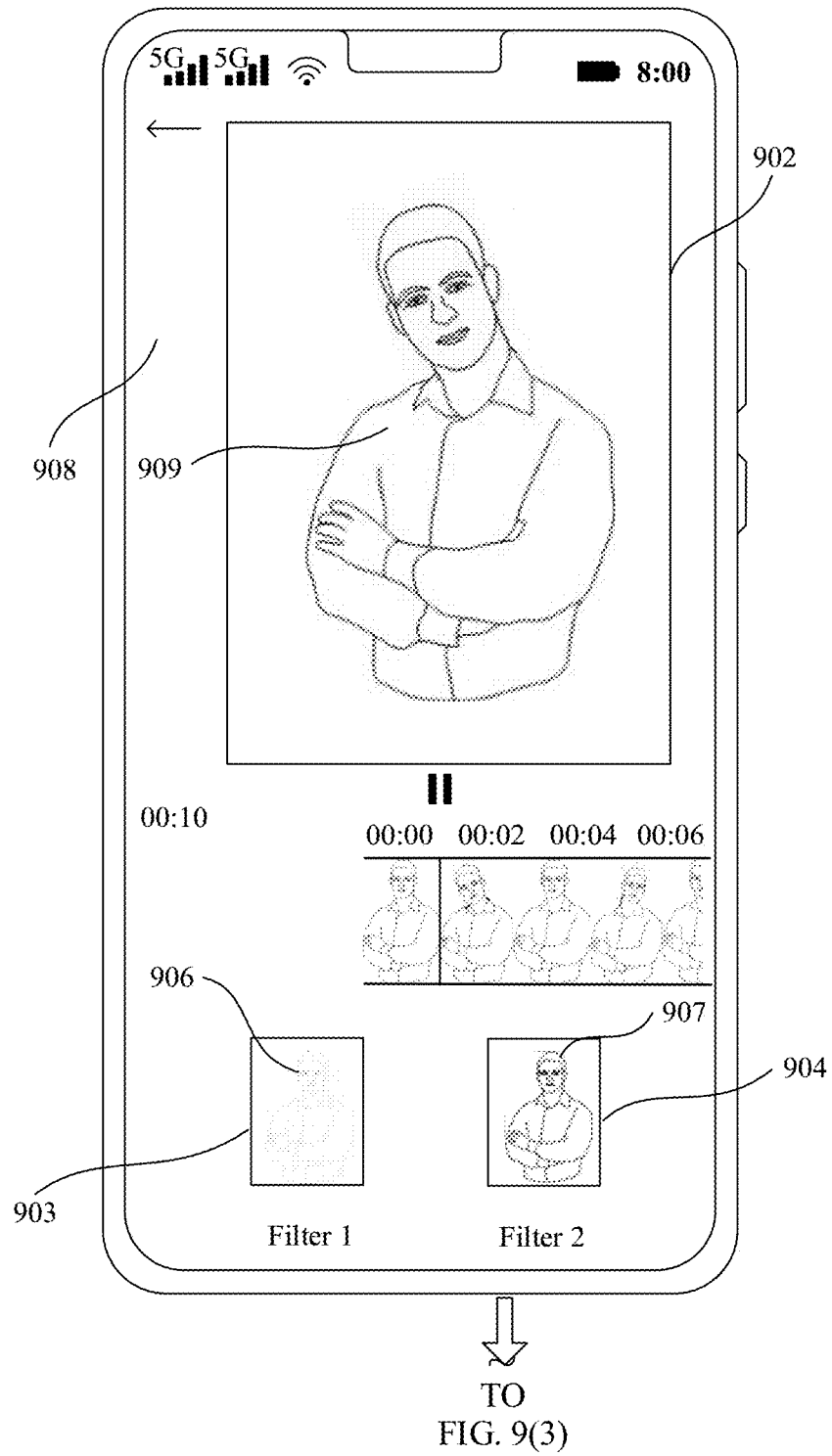
Figure 9:
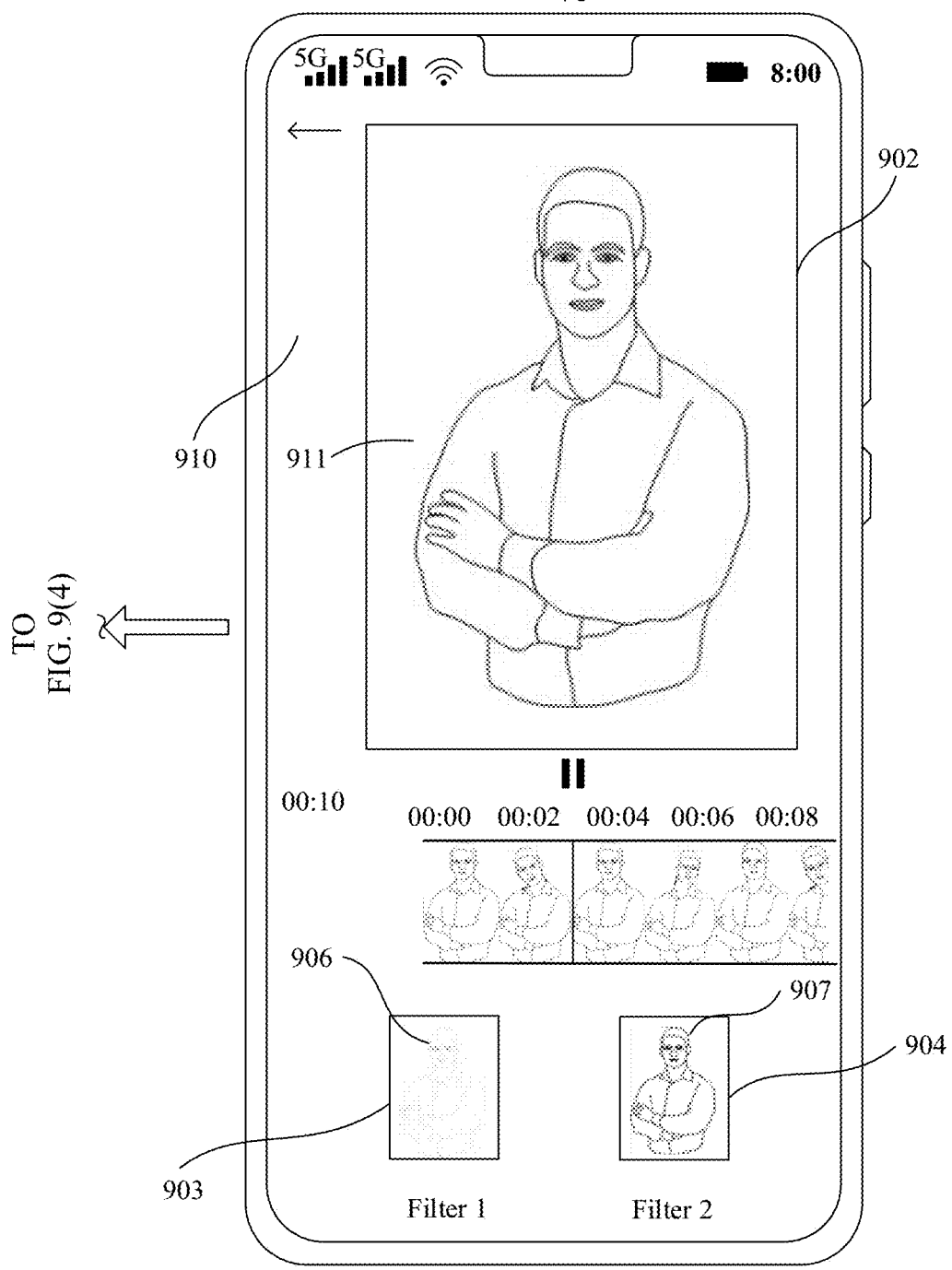
Figure 9:
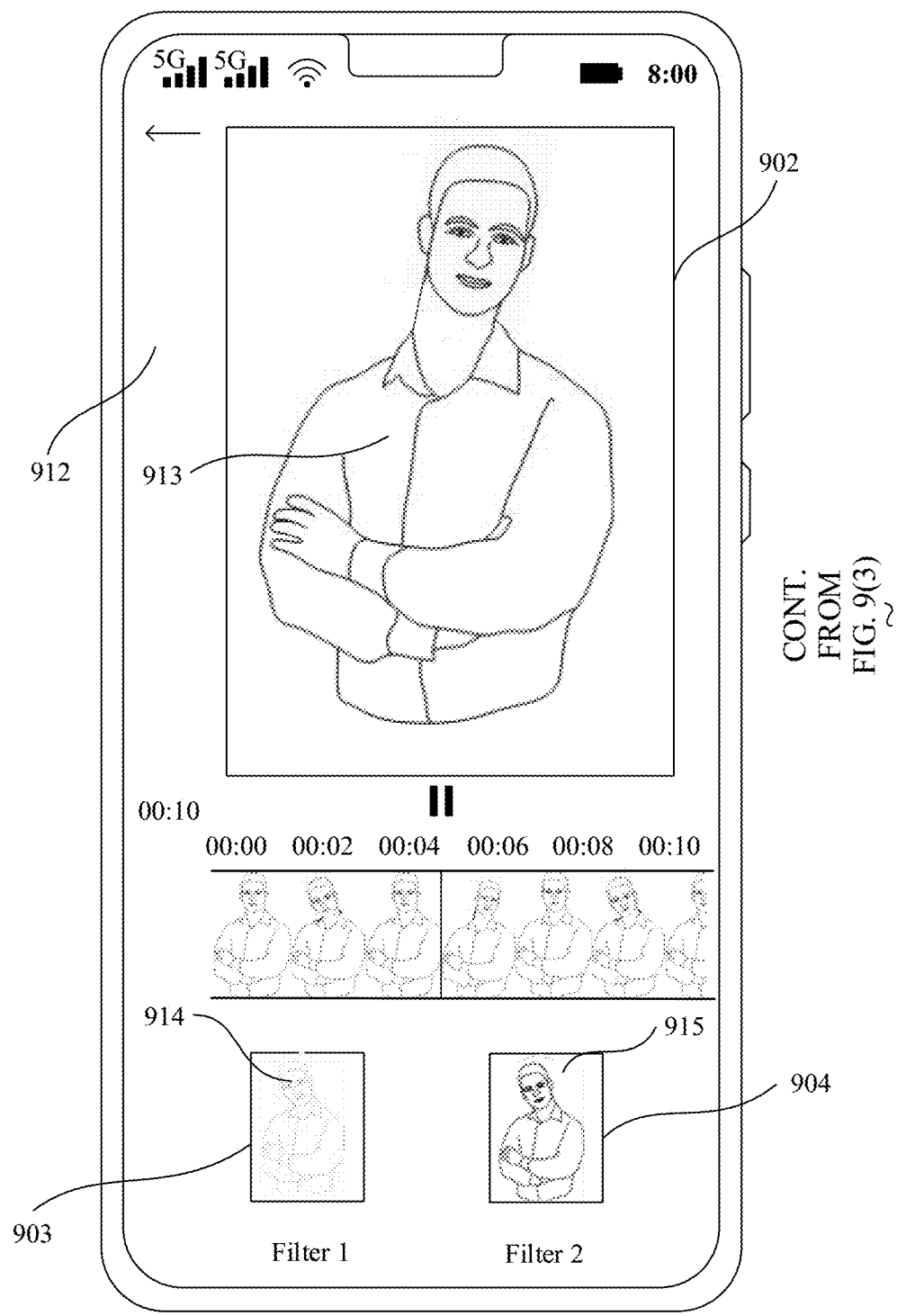

In some embodiments, as shown in FIG. 9(1), FIG. 9(2), FIG. 9(3), and FIG. 9(4), the mobile phone displays an interface 901 shown in FIG. 9(1). The interface 901 includes a preview box 902, a first window 903, and a second window 904. A first frame of video image 905 of the target video image is displayed in the preview box 902, a first frame of video image 906 of the first video is displayed in the first window 903, and a first frame of video image 907 of the second video is displayed in the second window 904. At a next moment, the mobile phone displays an interface 908 shown in FIG. 9(2). The interface 908 includes a preview box 902, a first window 903, and a second window 904. A second frame of video image 909 of the target video image is displayed in the preview box 902, the first frame of video image 906 of the first video is displayed in the first window 903, and the first frame of video image 907 of the second video is displayed in the second window 904. At a next moment, the mobile phone displays an interface 910 shown in FIG. 9(3). The interface 910 includes a preview box 902, a first window 903, and a second window 904. A third frame of video image 911 of the target video image is displayed in the preview box 902, the first frame of video image 906 of the first video is displayed in the first window 903, and the first frame of video image 907 of the second video is displayed in the second window 904. At a next moment, the mobile phone displays an interface 912 shown in FIG. 9(4). The interface 912 includes a preview box 902, a first window 903, and a second window 904. A fourth frame of video image 913 of the target video image is displayed in the preview box 902, a second frame of video image 914 of the first video is displayed in the first window 903, and a second frame of video image 915 of the second video is displayed in the second window 904.

Alternatively, that both the first sampled video and the second sampled video are videos formed by sampling m frames of video images from the video obtained after the target video file is decoded includes:

separately decoding the target video file twice to obtain two third videos, sampling m frames of video images in one third video to form the first sampled video, and sampling m frames of video images in the other third video to form the second sampled video.

Figure 10:
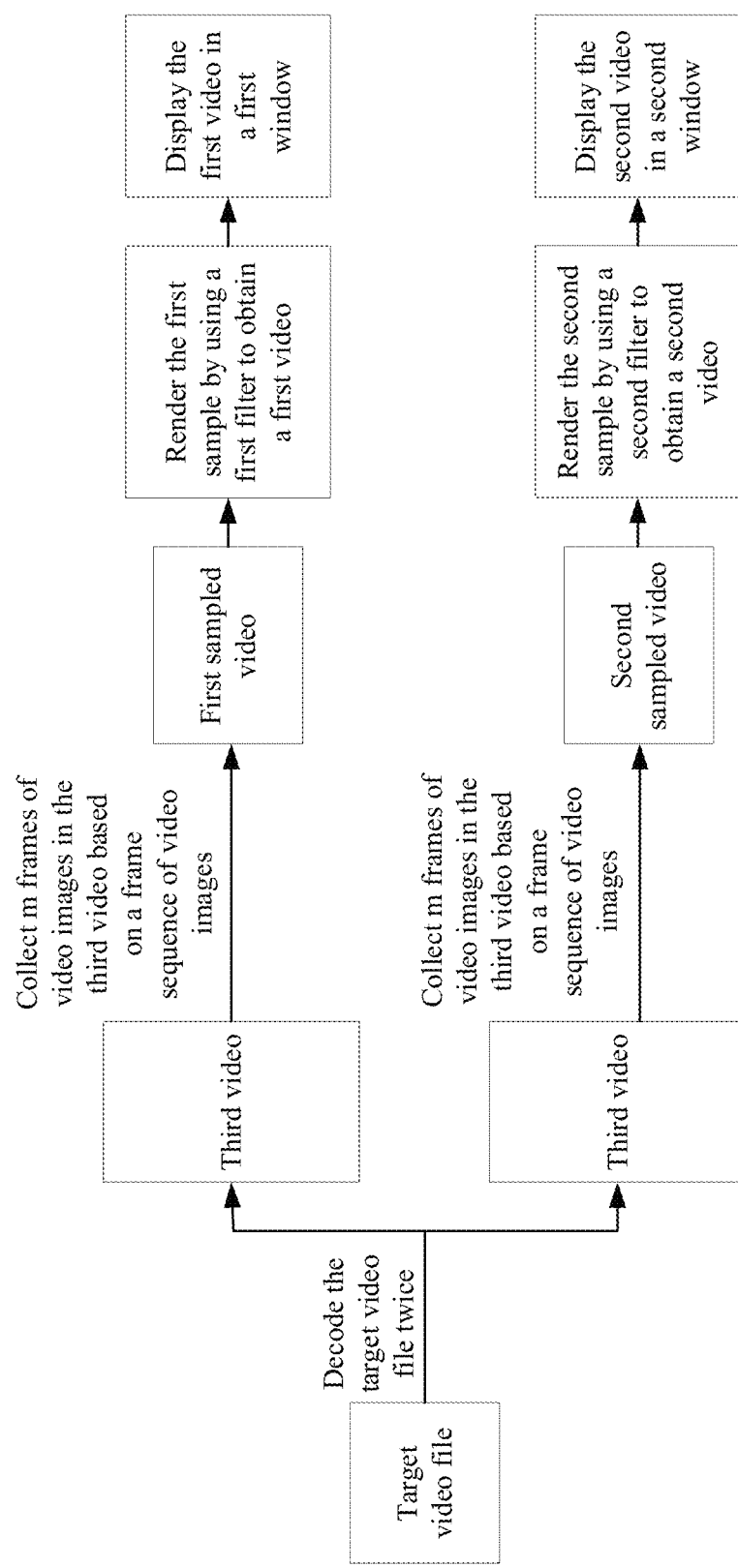
FIG. 10 is a schematic flowchart of another video processing method according to an embodiment of this application.

In this embodiment of this application, because a rendering effect achieved when the video obtained after the target video file is decoded uses each type of filter needs to be viewed, to facilitate implementation, the target video file may be decoded once for each filter type, to obtain a plurality of third videos. m frames of video images are sampled in each third video to form a corresponding sampled video, and the sampled video is sampled by using each type of filter to obtain a plurality of videos, and the plurality of videos are displayed in corresponding windows. For example, the electronic device includes two types of filters, and the electronic device may separately decode the target video file twice to obtain two third videos, sample m frames of video images in one third video to form the first sampled video, and sample m frames of video images in the other third video to form the second sampled video. The electronic device renders the first sampled video by using the first filter to obtain the first video, and displays the first video in the first window; and renders the second sampled video to obtain the second video, and display the second video in the second window, as shown in FIG. 10.

In some embodiments, the second preview interface further includes a progress display box whose display size is less than the display size of the preview box, and a video image in the fourth video is displayed in the progress display box.

The fourth video is the same as the target video, the progress display box includes a progress control configured to control the video image in the target video displayed in the preview box, and a video image that is in the fourth video and that is corresponding to the progress control in the progress display box is a video image in the target video displayed in the preview box. In this way, the user may adjust, by adjusting the video image that is in the fourth video and that is corresponding to the progress control in the progress display box, the video image in the target video displayed in the preview box.

In this embodiment of this application, the second preview interface further includes a progress display box. A video image in the fourth video is displayed in the progress display box. Because the target video is displayed in the preview box, the user cannot control playback content of the target video. To make it convenient for the user to adjust a video image in the target video displayed in the preview box, the progress display box is added. The user may adjust, by adjusting a video image that is in the fourth video and that is corresponding to the progress control in the progress display box, the video image in the target video displayed in the preview box.

To not affect a display effect of the preview box, a display size of the progress display box is less than the display size of the preview box.

In some embodiments, resolution of the fourth video is less than the resolution of the target video.

Based on that the electronic device displays video images in a video frame by frame, content of video images between two adjacent frames is highly similar, and display space of the progress display box is relatively small, so that resolution of the video displayed in the progress display box can be reduced; in other words, the resolution of the fourth video can be reduced, that is, display details of the fourth video can be reduced. Because the display space of the progress display box is relatively small, even if the resolution of the fourth video is reduced, the user can hardly experience a difference, and resource loss of the electronic device can be reduced, and a processing speed of the electronic device can be improved. Therefore, the electronic device may adjust the resolution of the fourth video based on the display space of the progress display box.

In some embodiments, the display sizes of the first window, the second window, and the progress display box are the same, so that a display interface can be neat, and a better visual effect is provided for the user. If the display sizes of the first window, the second window, and the progress display box are the same, the resolution of the first video, the resolution of the second video, and the resolution of the fourth video are the same. To reduce resource consumption of the electronic device, after decoding the target video file once to obtain the third video, the electronic device may reduce the resolution of the third video, transmit a part of the third video whose resolution is reduced to the progress display box for display as the fourth video, and use the other part of the third video whose resolution is reduced as a sampled video, perform rendering of a corresponding filter, and separately display the sampled video in the first window and the second window.

Figure 11:
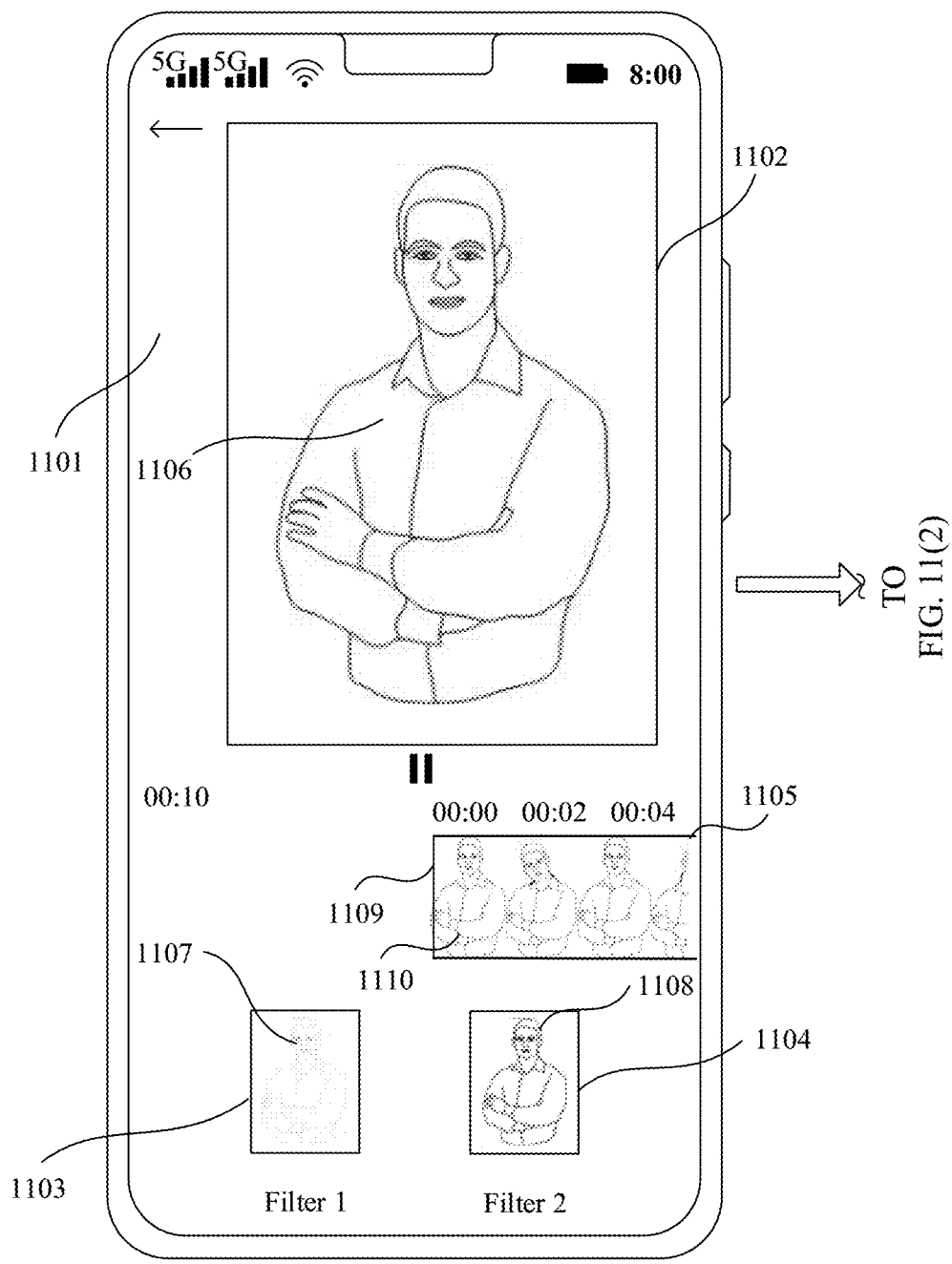
FIG. 11(1) and FIG. 11(2) are a schematic diagram of another video processing scenario according to an embodiment of this application.
Figure 11:
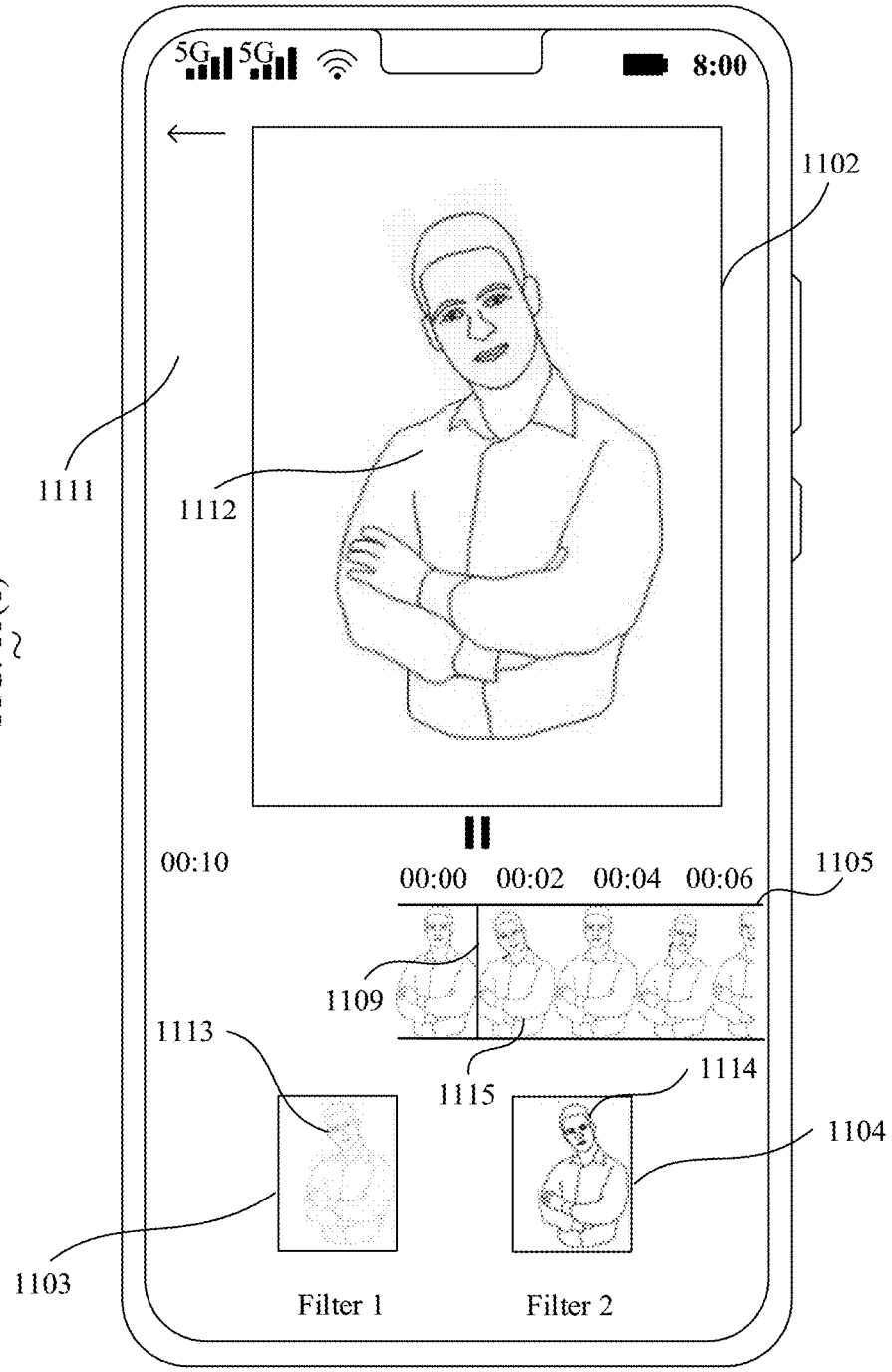

In some embodiments, the mobile phone displays an interface 1101 shown in FIG. 11(1). The interface 1101 includes a preview box 1102, a first window 1103, a second window 1104, and a progress display box 1105. A first frame of video image 1106 of the target video image is displayed in the preview box 1102, a first frame of video image 1107 of the first video is displayed in the first window 1103, a first frame of video image 1108 of the second video is displayed in the second window 1104, a video image of the fourth video is displayed in the progress display box 1105, and a progress control 1109 corresponds to a first frame of video 1110 of the fourth video. At a next moment, the mobile phone displays an interface 1111 shown in FIG. 11(2). The interface 1111 includes a preview box 902, a first window 903, a second window 1104, and a progress display box 1105. A second frame of video image 1112 of the target video image is displayed in the preview box 1102, a second frame of video image 1113 of the first video is displayed in the first window 1103, a second frame of video image 1114 of the second video is displayed in the second window 1104, a video image of the fourth video is displayed in the progress display box 1105, and a progress control 1109 corresponds to a second frame of video 1115 of the fourth video.

Figure 12:
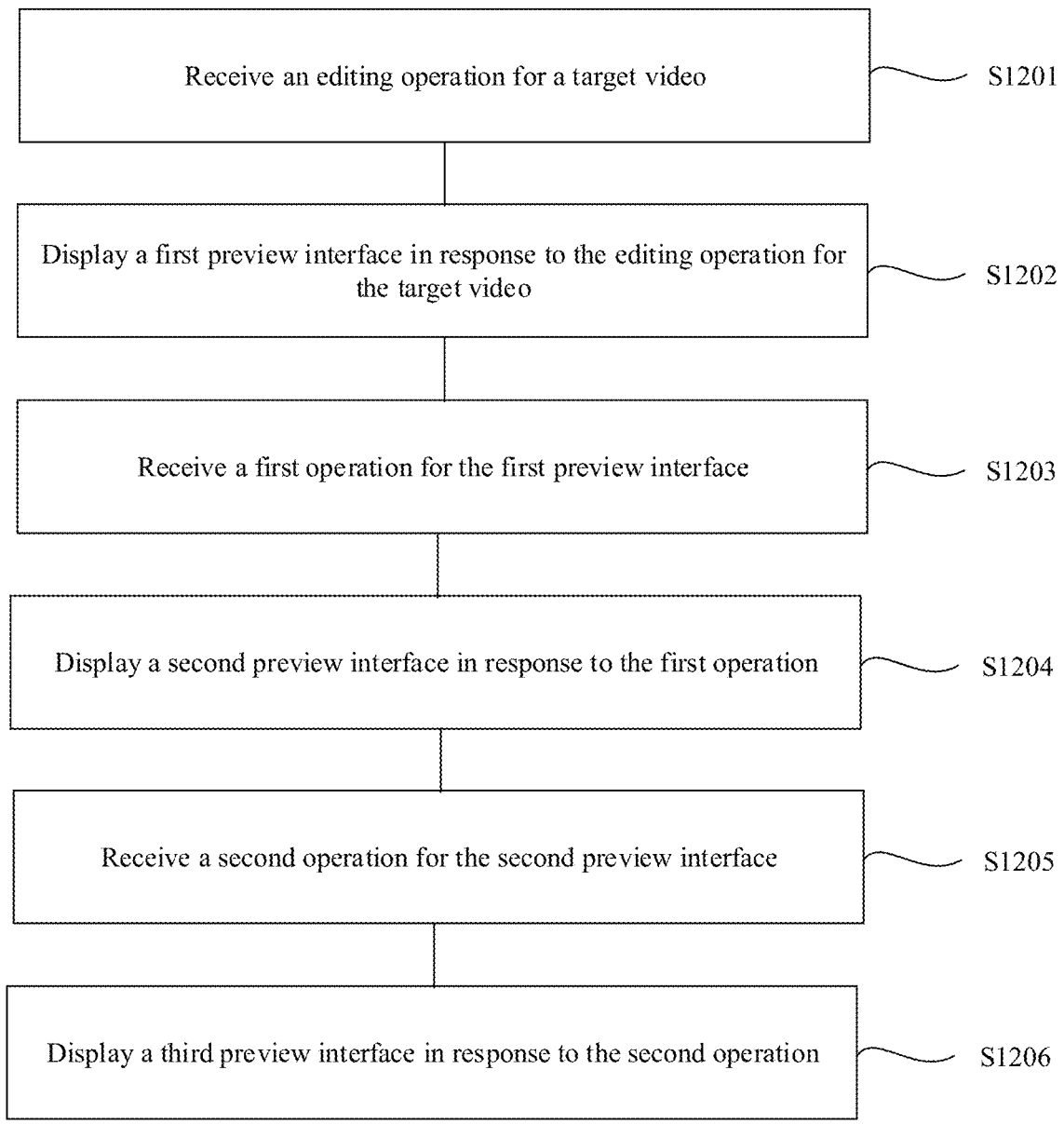
FIG. 12 is a schematic flowchart of another video processing method according to an embodiment of this application.

FIG. 12 is a schematic flowchart of another video processing method according to an embodiment of the present invention. The method is applied to an electronic device. As shown in FIG. 12, the method includes the following steps.

Step S1201: Receive an editing operation for a target video.

For details, refer to step S401. Details are not described herein.

Step S1202: Display a first preview interface in response to the editing operation for the target video.

The first preview interface includes a preview box, the target video is displayed in the preview box, and the target video is a video obtained after a target video file is decoded.

For details, refer to step S402. Details are not described herein.

Step S1203: Receive a first operation for the first preview interface.

For details, refer to step S403. Details are not described herein.

Step S1204: Display a second preview interface in response to the first operation.

The second preview interface includes a preview box, a first window, and a second window. At a first moment, the target video is displayed in the preview box, an $i^{th}$ frame of video image of the first video is displayed in the first window, an $i^{th}$ frame of video image of the second video is displayed in the second window, the first video is a video obtained after a first sampled video is rendered by using a first filter, the first video includes m frames of video images, the second video is a video obtained after a second sampled video is rendered by using a second filter, the second video includes m frames of video images, both the first sampled video and the second sampled video are videos formed by sampling m frames of video images from the video obtained after the target video file is decoded, i is an integer greater than 0 and less than m, and m is an integer greater than 1.

At the second moment, the target video is displayed in the preview box, the $(i+1)^{th}$ frame of video image of the first video is displayed in the first window, and the $(i+1)^{th}$ frame of video image of the second video is displayed the second window.

For details, refer to step S404. Details are not described herein.

Step S1205: Receive a second operation for the second preview interface.

The second operation is used to indicate a target filter selected by a user.

In this embodiment of this application, if the user needs to use the target filter, the user may select the target filter from the second preview interface, and send the second operation to the electronic device.

Step S1206: Display a third preview interface in response to the second operation.

The third preview interface includes a preview box, a first window, and a second window. A fifth video is displayed in the preview box, the first video is displayed in the first window, the second video is displayed in the second window, and the fifth video is a video obtained after the target video is rendered by using the target filter.

In this embodiment of this application, after receiving the second operation, the electronic device may learn, by using the second operation, the target filter selected by the user. In this case, the electronic device may render the target video by using the target filter to obtain the fifth video, and display the fifth video in the preview box for the user to watch.

Figure 13:
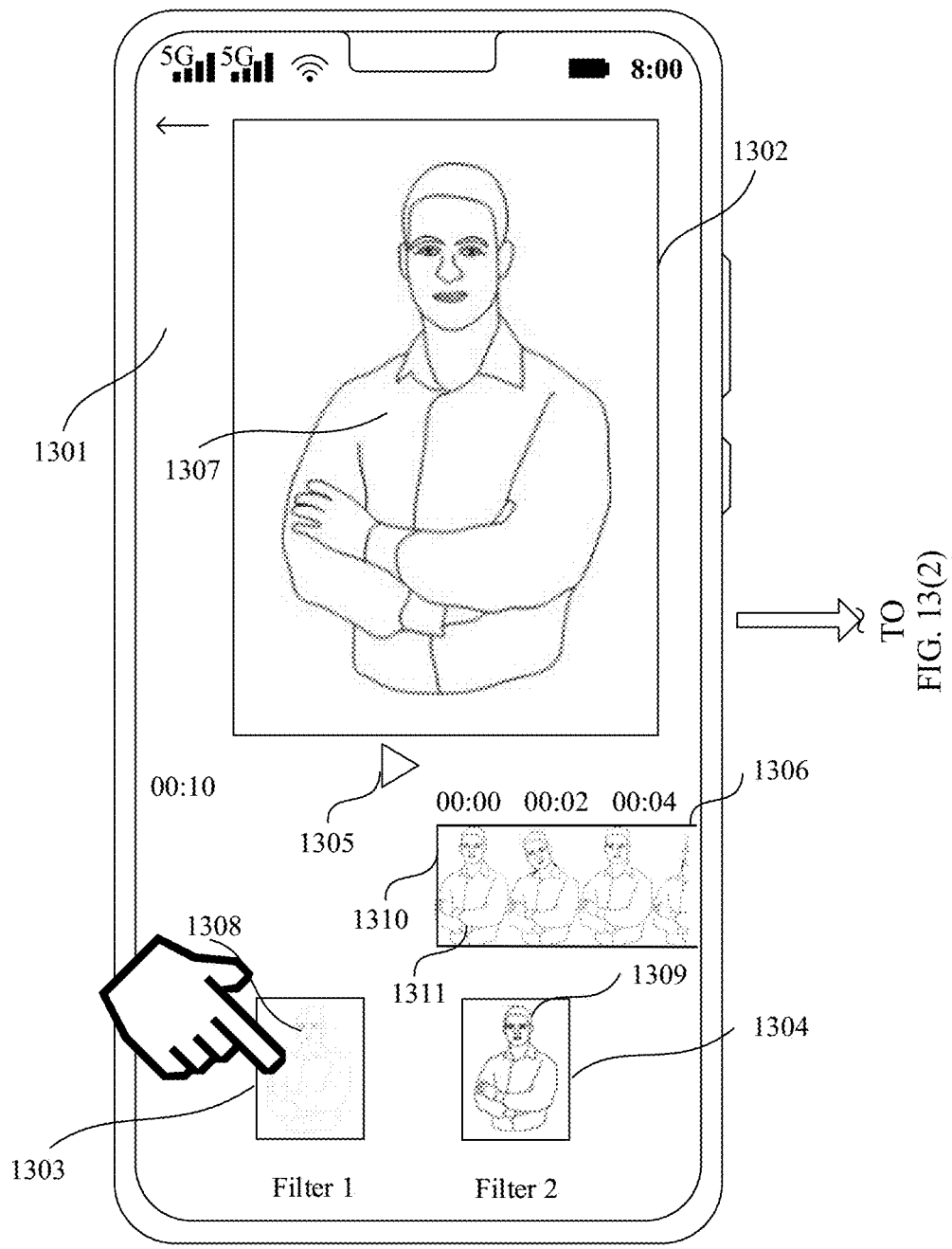
FIG. 13(1), FIG. 13(2), and FIG. 13(3) are a schematic diagram of another video processing scenario according to an embodiment of this application.
Figure 13:
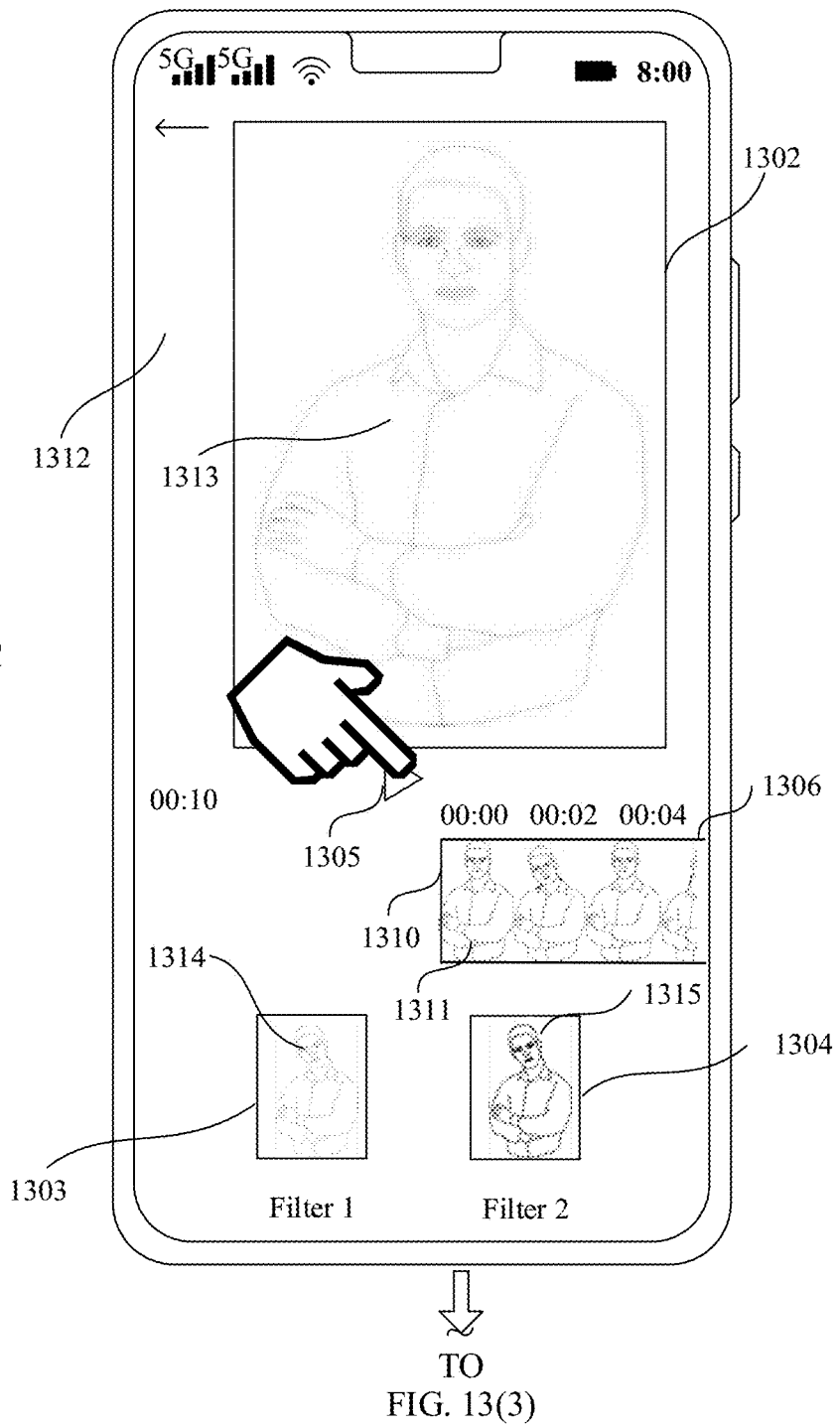
Figure 13:
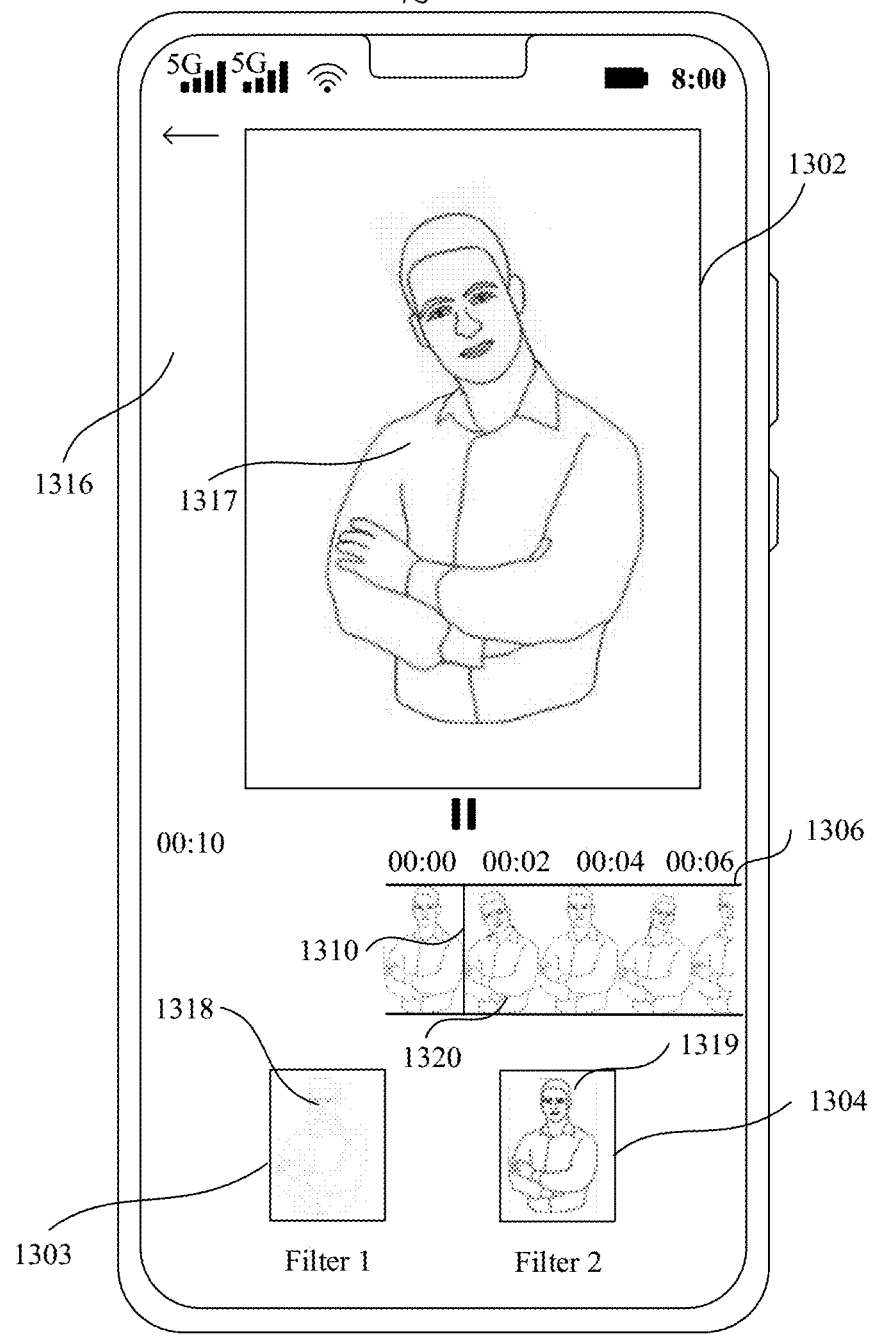

In some embodiments, as shown in FIG. 7a(1), if the user needs to add a filter effect to the target video, a filter control 703 may be operated. In response to that the user operates the filter control 703, a mobile phone displays an interface 1301 shown in FIG. 13(1). The interface 1301 includes a preview box 1302, a first window 1303, a second window 1304, a play control 1305, and a progress display box 1306. The target video is displayed in the preview box 1302, and in this case, only a first frame of video image 1307 of the target video is displayed in the preview box 1302. A first frame of video image 1308 of the first video is displayed in the first window 1303, and a first frame of video image 1309 of the second video is displayed in the second window 1304. The progress display box 1306 includes a progress control 1310, a video image of a fourth video is displayed in the progress display box 1306, and the progress control 1310 corresponds to a first frame of video image 1311 of the fourth video. It is assumed that the user selects a first filter, and in response to an operation of selecting the first window 1303 by the user, the mobile phone displays an interface 1312 shown in FIG. 13(2). The interface 1312 includes a preview box 1302, a first window 1303, a second window 1304, a play control 1305, and a progress display box 1306. The fifth video is displayed in the preview box 1302, and in this case, only a first frame of video image 1313 of the fifth video is displayed in the preview box 1302. A second frame of video image 1314 of the first video is displayed in the first window 1303, and a second frame of video image 1315 of the second video is displayed in the second window 1304. A video image of the fourth video is displayed in the progress display box 1306, and a progress control 1310 corresponds to a first frame of video image 1311 of the fourth video. The fifth video is a video obtained after the target video is rendered by using the first filter. In response to an operation performed by the user on the play control 1305, the mobile phone displays an interface 1316 shown in FIG. 13(3), and the interface 1316 includes a preview box 1302, a first window 1303, a second window 1304, and a progress display box 1306. A second frame of video image 1317 of the fifth video is displayed in the preview box 1302. A third frame of video image 1318 of the first video is displayed in the first window 1303, and a third frame of video image 1319 of the second video is displayed in the second window 1304. A video image of the fourth video is displayed in the progress display box 1306, and a progress control 1310 corresponds to a second frame of video image 1320 of the fourth video.

During edition of a video, m frames of video images obtained after a target video file is decoded are used as a first sampled video and a second sampled video, the first sampled video is rendered by using a first filter to obtain a first video, the second sampled video is rendered by using a second filter to obtain a second video, the first video is displayed in a first window, and the second video is displayed in a second window; at a first moment, an $i^{th}$ frame of video image of the first video is displayed in the first window, and an $i^{th}$ frame of video image of the second video is displayed in the second window; and at a second moment, an $(i+1)^{th}$ frame of video image of the first video is displayed in the first window, and an $(i+1)^{th}$ frame of video image of the second video is displayed in the second window. In this way, a video obtained after the target video file is decoded may be rendered by using different types of filters, and the video is displayed in a corresponding window, so that a user can intuitively observe a difference between different filters applied to the video obtained after the target video file is decoded, and therefore, the user can choose a required edition type, and user experience is improved.

Figure 14:
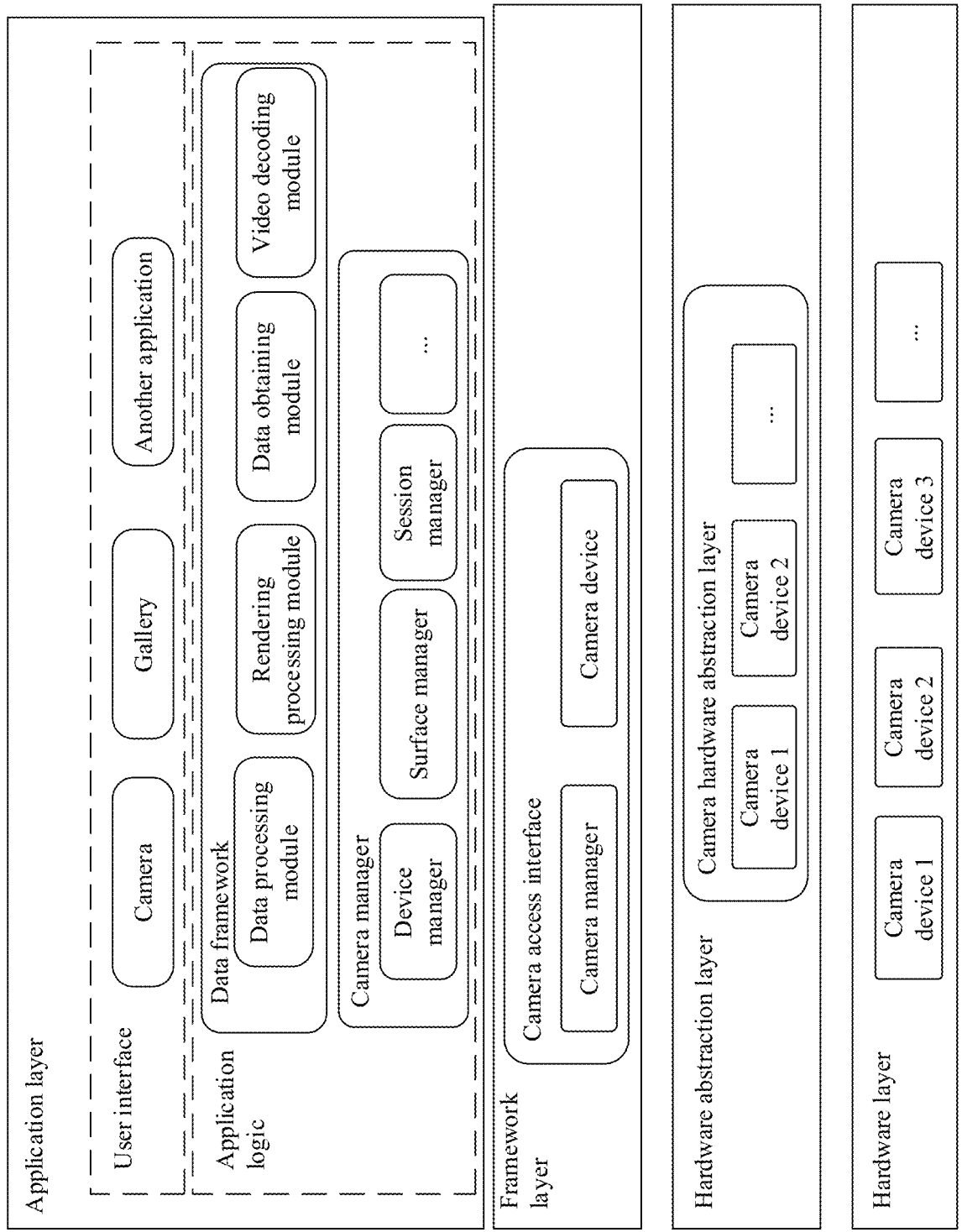
FIG. 14 is a block diagram of a software structure of an electronic device according to an embodiment of this application.

FIG. 14 is a block diagram of a software structure of an electronic device according to an embodiment of this application. In a hierarchical architecture, software is divided into several layers, and each layer has a clear role and task. Layers communicate with each other by using a software interface. In some embodiments, an Android (Android) system is divided into four layers: an application layer, a framework layer, a hardware abstraction layer, and a hardware layer from top to bottom.

The application layer (Application, App) may include a series of application packages. For example, the application package may include a camera application. The application layer may be further divided into a user interface (user interface, UI) and application logic.

As shown in FIG. 14, a UI layer includes Camera, Gallery, and another application.

The application logic includes a data framework and a camera manager. The data framework includes a data obtaining module, a rendering processing module, a data processing module, and a video decoding module. The data obtaining module is configured to obtain a target video file. The data processing module is configured to control display of videos of different filter rendering effects in a display interface. The rendering processing module is configured to render a video image. The video decoding module is configured to decode a video file to obtain a video. The camera manager includes a device management module, a surface management module, a session management module, and the like. In the Android system, Surface corresponds to a screen buffer and is used to store pixel data of a current window.

The framework layer (Framework, FWK) provides an application programming interface (application programming interface, API) and a programming framework for an application at the application layer, including some predefined functions. In FIG. 14, the framework layer includes a camera access interface (Camera2 API). Camera2 API is a set of interfaces for accessing a camera device that is introduced by Android, and uses a pipeline design, so that a data stream flows from a camera to Surface. Camera2 API includes a camera manager (CameraManager) and a camera device (CameraDevice). CameraManager is a management class of the camera device. Camera device information of a device may be quired by using an object of this class to obtain a CameraDevice object. CameraDevice provides a series of fixed parameters related to the camera device, for example, basis settings and an output format.

The hardware abstraction layer (HAL) is an interface layer that is located between an operating system kernel and a hardware circuit, and is intended to abstract hardware. The hardware abstraction layer hides hardware interface details of a specific platform, provides a virtual hardware platform for an operating system, and makes the operating system hardware-independent and capable of being transplanted on a plurality of platforms. In FIG. 14, the HAL includes a camera hardware abstraction layer (Camera HAL), and the Camera HAL includes a device (Device) 1, a device (Device) 2, a device (Device) 3, and the like. It may be understood that the device 1, the device 2, and the device 3 are abstract devices.

The hardware layer (HardWare, HW) is hardware at a bottom layer of the operating system. In FIG. 14, HW includes a camera device (CameraDevice) 1, a camera device (CameraDevice) 2, a camera device (CameraDevice) 3, and the like. CameraDevice1, CameraDevice2, and CameraDevice3 may correspond to a plurality of cameras on an electronic device.

Figure 15A:
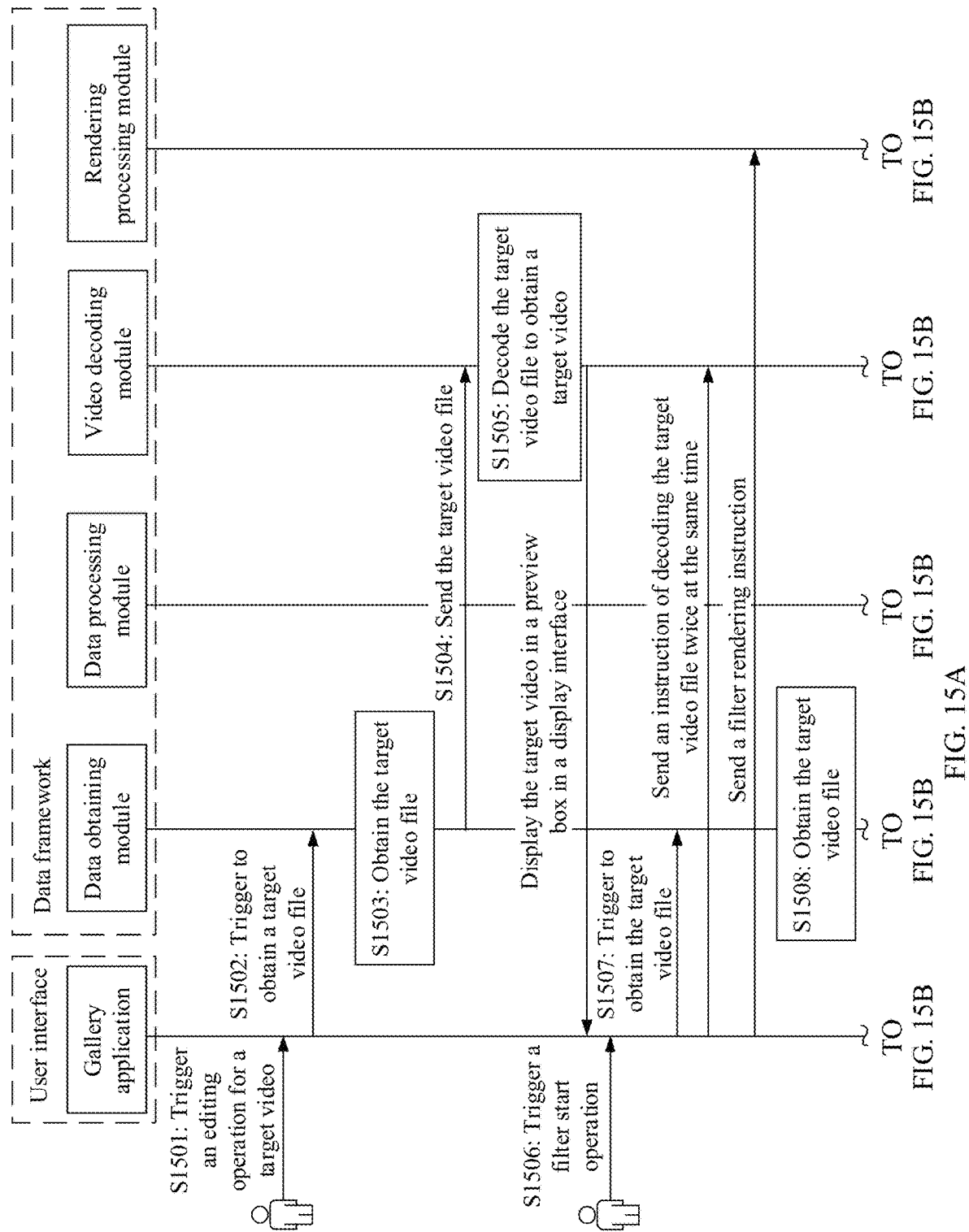
FIG. 15A and FIG. 15B are a schematic flowchart of another video processing method according to an embodiment of this application.
Figure 15B:
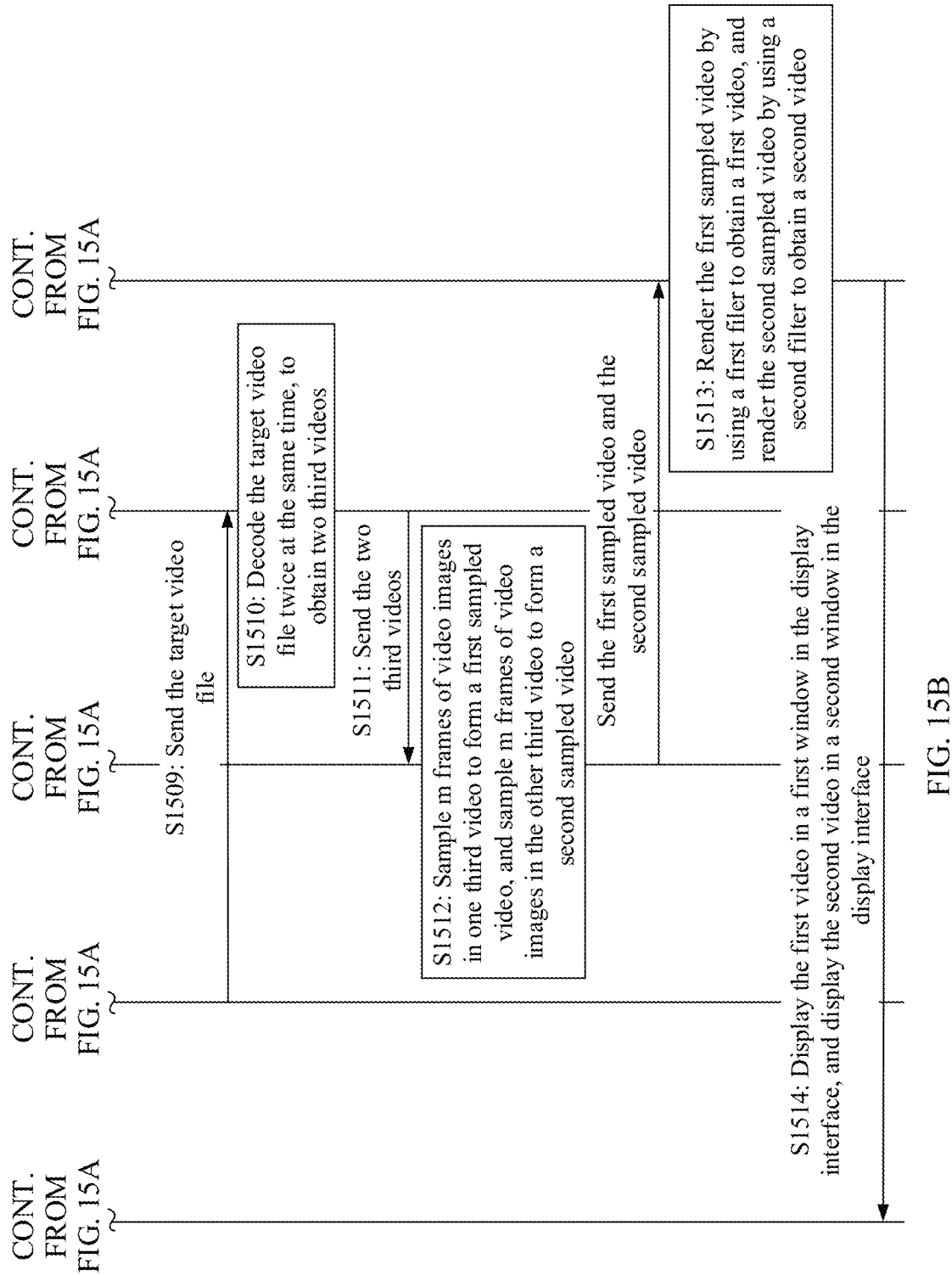

FIG. 15A and FIG. 15B are a schematic flowchart of another video processing method according to an embodiment of this application. In this embodiment of this application, for ease of implementation, a video decoding module needs to obtain, through decoding, one third video for each type of filter, and obtain, through decoding, at least two third videos for at least two types of filters. In this embodiment of this application, as an example for description, an electronic device includes two types of filters. The electronic device may alternatively include three of more filter types, and this is not limited in this application. The method may be applied to the software structure shown in FIG. 14, and mainly includes the following steps.

S1501: A Gallery application of the electronic device receives an editing operation for a target video.

Specifically, when a user needs to edit the target video, the user may send the editing operation for the target video to the Gallery application of the electronic device.

S1502: The Gallery application of the electronic device triggers a data obtaining module to obtain a target video file.

Specifically, Gallery of a television device receives an instruction for triggering the data obtaining module to obtain the target video file corresponding to the editing operation for the target video.

S1503: The data obtaining module of the electronic device obtains the target video file.

When the user needs to edit a target file, the user may send, to the electronic device, an edition mode selection operation selected by the user.

S1504: The data obtaining module of the electronic device sends the obtained target video file to a video decoding module.

S1505: The video decoding module decodes the target video file to obtain a target video, and sends the target video to a preview box in a display interface for display.

S1506: The Gallery application of the electronic device receives a filter start operation.

S1507: The Gallery application of the electronic device triggers the data obtaining module to obtain the target video file, send an instruction for decoding the target video file twice to the video decoding module, and send a filter rendering instruction to a filter rendering module.

The filter rendering instruction is used to instruct the filter rendering module to separately render a received video by using each type of filter in the filter rendering module.

S1508: The data obtaining module of the electronic device obtains the target video file.

It should be noted that, if the data obtaining module buffers the target video file in a storage unit and has not deleted the target video file after obtaining the target video file in step 1503, the data obtaining module only needs to obtain the target video file from the storage unit of the data obtaining module.

S1509: The data obtaining module of the electronic device transmits the target video file to the video decoding module.

S1510: The video decoding module of the electronic device decodes the target video file twice to obtain two third videos.

S1511: The video decoding module of the electronic device transmits the two third videos to a data processing module.

S1512: The data processing module of the electronic device samples m frames of video images in one third video to form a first sampled video, samples m frames of video images in the other third video to form a second sampled video, and sends the first sampled video and the second sampled video to the filter rendering module.

Specifically, after receiving the two third videos, the data processing module of the electronic device samples m frames of video images for each third video to obtain two sampled videos, that is, the first sampled video and the second sampled video.

m is greater than 0, and is not greater than a total quantity of frames of video images included in the third video.

S1513: The filter rendering module of the electronic device renders the first sampled video by using a first filter to obtain a first video, and renders the second sampled video by using a second filter to obtain a second video.

S1514: The filter rendering module of the electronic device sends the first video and the second video to the display interface, so that the first video is displayed in a first window in the display interface, and the second video is displayed in a second window.

Figure 16A:
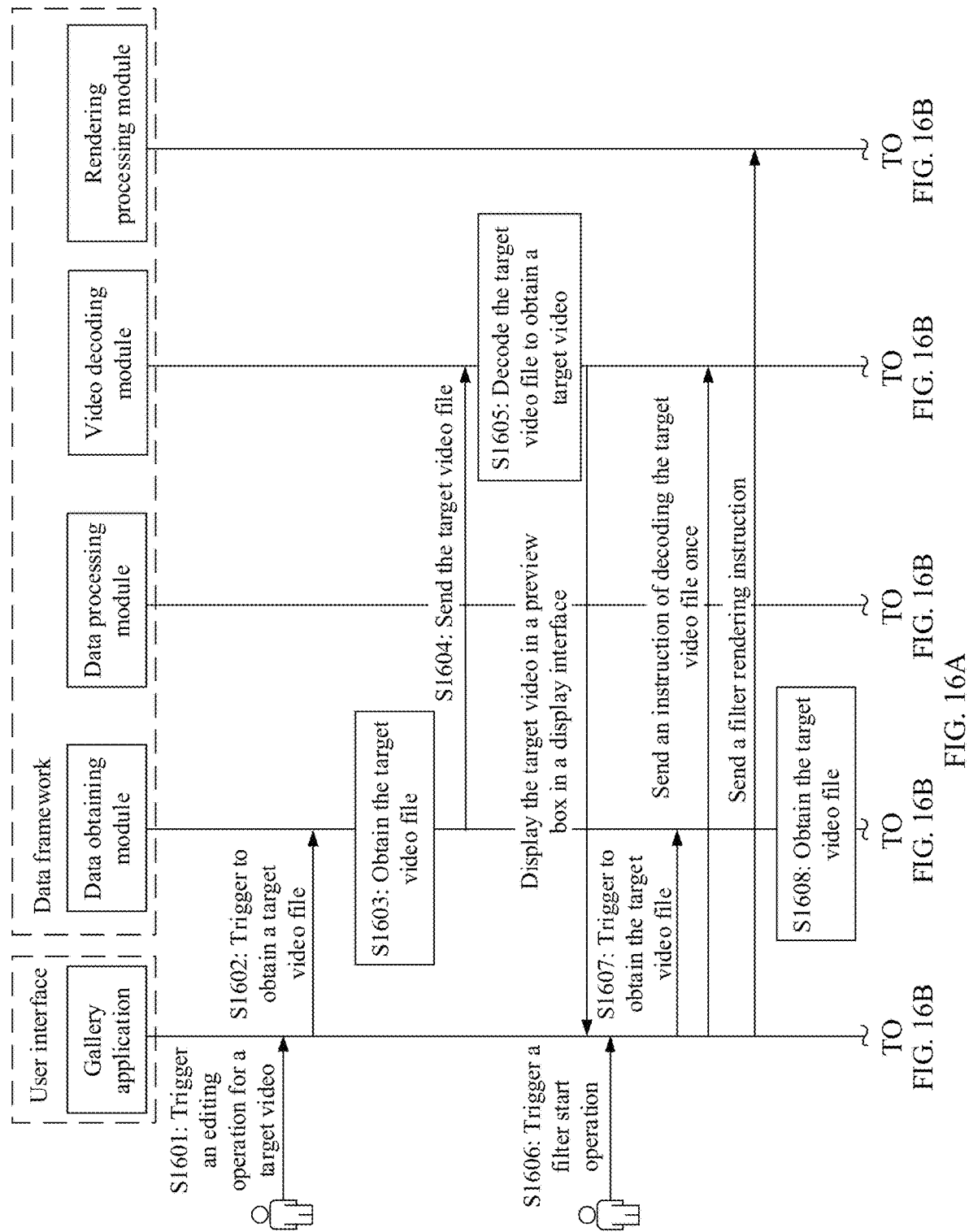
FIG. 16A and FIG. 16B are a schematic flowchart of another video processing method according to an embodiment of this application.
Figure 16B:
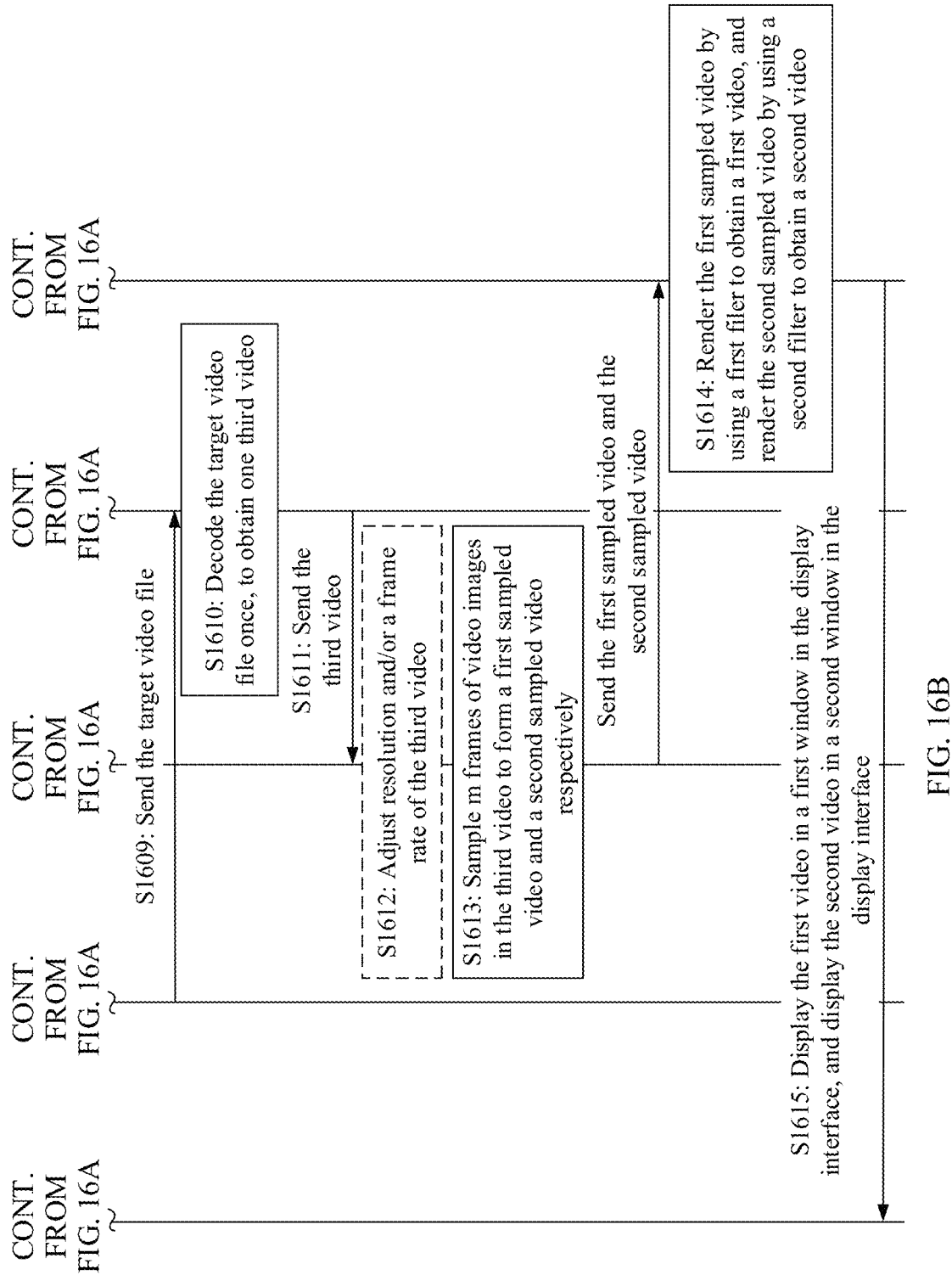

FIG. 16A and FIG. 16B are a schematic flowchart of another video processing method according to an embodiment of this application. In this embodiment of this application, a video decoding module obtains only one third video through decoding. In this embodiment of this application, as an example for description, an electronic device includes two types of filters. The electronic device may alternatively include three of more filter types, and this is not limited in this application. The method may be applied to the software structure shown in FIG. 14, and mainly includes the following steps.

S1601: A Gallery application of the electronic device receives an editing operation for a target video.

Specifically, when a user needs to edit the target video, the user may send the editing operation for the target video to the Gallery application of the electronic device.

S1602: The Gallery application of the electronic device triggers a data obtaining module to obtain a target video file.

Specifically, Gallery of the electronic device receives an instruction for triggering the data obtaining module to obtain the target video file corresponding to the editing operation for the target video.

S1603: The data obtaining module of the electronic device obtains the target video file.

When the user needs to edit a target file, the user may send, to the electronic device, an edition mode selection operation selected by the user.

S1604: The data obtaining module of the electronic device sends the obtained target video file to a video decoding module.

S1605: The video decoding module decodes the target video file to obtain a target video, and sends the target video to a preview box in a display interface for display.

S1606: The Gallery application of the electronic device receives a filter start operation.

S1607: The Gallery application of the electronic device triggers the data obtaining module to obtain the target video file, send an instruction for decoding the target video file once to the video decoding module, and send a filter rendering instruction to a filter rendering module.

S1608: The data obtaining module of the electronic device obtains the target video file.

It should be noted that, if the data obtaining module buffers the target video file in a storage unit and has not deleted the target video file after obtaining the target video file in step 1603, the data obtaining module only needs to obtain the target video file from the storage unit of the data obtaining module.

S1609: The data obtaining module of the electronic device transmits the target video file to the video decoding module.

S1610: The video decoding module of the electronic device decodes the target video file once to obtain one third video.

S1611: The video decoding module of the electronic device transmits the third video to a data processing module.

It should be noted that, after the data processing module of the electronic device receives the third video, because a display size of a first window and a display size of a second window in the display interface are less than a display size of a preview box, the electronic device may adjust resolution and/or a frame rate of the third video, or certainly may not adjust the resolution and/or the frame rate of the third video. If the resolution and/or the frame rate of the third video are/is not adjusted, step S1613 is directly performed; or if the resolution and/or the frame rate of the third video are/is adjusted, step S1612 is performed.

S1612: The data processing module of the electronic device adjusts the resolution and/or the frame rate of the third video.

S1613: The data processing module of the electronic device samples m frames of video images in the third video to form a first sampled video and a second sampled video respectively, and sends the first sampled video and the second sampled video to the filter rendering module.

Specifically, after obtaining the third video, the data processing module of the electronic device may sample m frames of video images in the third video, and respectively form the first sampled video and the second sampled video by using the m frames of video images.

m is greater than 0, and is not greater than a total quantity of frames of video images included in the third video.

S1614: The filter rendering module of the electronic device renders the first sampled video by using a first filter to obtain a first video, and renders the second sampled video by using a second filter to obtain a second video.

S1615: The filter rendering module of the electronic device sends the first video and the second video to the display interface, so that the first video is displayed in a first window in the display interface, and the second video is displayed in a second window.

In this way, a video obtained after the target video file is decoded may be rendered by using different types of filters, and the video is displayed in a corresponding window, so that the user can intuitively observe a difference between different filters applied to the video obtained after the target video file is decoded, and therefore, the user can choose a required edition type, and user experience is improved.

Corresponding to the foregoing method embodiments, this application further provides an electronic device. The electronic device includes a memory configured to store a computer program instruction and a processor configured to execute the program instruction. When the computer program instruction is executed by the processor, the electronic device is triggered to perform some or all steps in the foregoing method embodiments.

Figure 17:
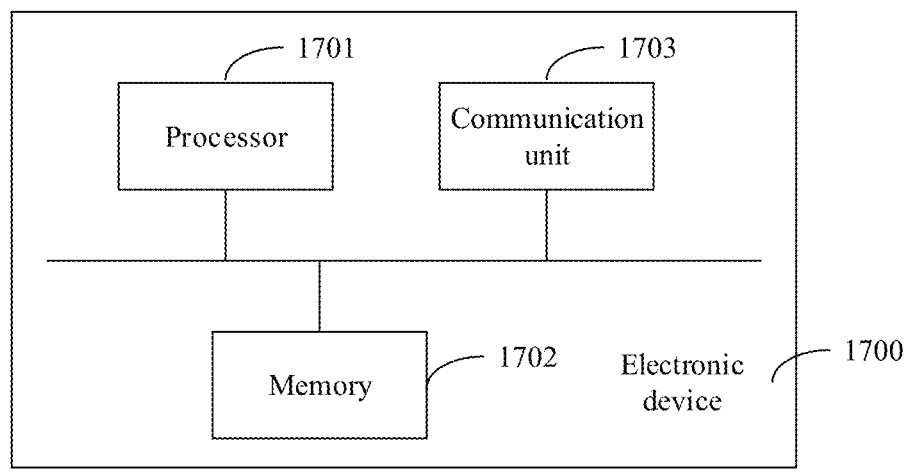
FIG. 17 is a schematic diagram of a structure of an electronic device according to an embodiment of this application.

FIG. 17 is a schematic diagram of a structure of an electronic device according to an embodiment of this application. As shown in FIG. 17, the electronic device 1700 may include a processor 1701, a memory 1702, and a communication unit 1703. These components communicate with each other by using one or more buses. A person skilled in the art may understand that a structure of a server shown in the figure does not constitute a limitation on this embodiment of the present invention. The structure may be a bus structure, may be a star-shaped structure, or may include more or fewer components than those shown in the figure, combine some components, or have different component arrangements.

The communication unit 1703 is configured to: establish a communication channel, so that the storage device can communicate with another device, and receive user data sent by the another device or send user data to the another device.

The processor 1701 is a control center of the storage device, and is connected to all parts of the entire electronic device by using various interfaces and lines, and performs various functions of the electronic device and processes data by running or executing the software program and/or the module that are stored in the memory 1702 and invoking data stored in the memory. The processor may include an integrated circuit (integrated circuit, IC), for example, may include a single packaged IC, or may include a plurality of connected packaged ICs of a same function or different functions. For example, the processor 1701 may include only a central processing unit (central processing unit, CPU). In an implementation of the present invention, the CPU may be a single computing core, or may include a plurality of computing cores.

The memory 1702 is configured to store an executable instruction of the processor 1701. The memory 1702 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

When the executable instruction in the memory 1702 is executed by the processor 1701, the electronic device 1700 can perform some or all steps in the embodiment shown in FIG. 12.

In specific implementation, this application further provides a computer storage medium. The computer storage medium may store a program, and when the program runs, a device in which the computer readable storage medium is located is controlled to perform some or all steps in the foregoing embodiments. The storage medium may be a magnetic disk, an optical disc, a read-only memory (English: read-only memory, ROM for short), a random access memory (English: random access memory, RAM for short), or the like.

In specific implementation, an embodiment of this application further provides a computer program product. The computer program product includes an executable instruction, and when the executable instruction is executed on a computer, the computer is enabled to perform some or all steps in the foregoing method embodiments.

In embodiments of this application, "at least one" means one or more, "a plurality of" means two or more, and "and/or" is an association relationship that describes associated objects, and represents that there may be three relationships. For example, A and/or B may represent the following cases: only A exists, both A and B exist, and only B exists. A and B may be singular or plural numbers. The character "/" generally indicates that associated objects are in an "or" relationship. "At least one of the following" or a similar expression means any combination of these items, including any combination of a single item or a plurality of items. For example, at least one of a, b, and c may represent a, b, c, a-b, a-c, b-c, or a-b-c, where a, b, and c may be a singular or plural number.

A person of ordinary skill in the art may recognize that, units and algorithm steps described in the embodiments disclosed in this specification may be implemented by electronic hardware or a combination of computer software and electronic hardware. Whether these functions are executed by using hardware or software depends on specific applications and design constraints of the technical solution. A person skilled in the art may use different methods for each specific application to implement the described functions, but such implementation should not be considered as beyond the scope of this application.

A person skilled in the art may clearly know that, for convenience and brevity of description, for a specific working process of the foregoing system, apparatus, and unit, refer to a corresponding process in the foregoing method embodiments, and details are not described herein again.

In several embodiments provided in this application, any function may be stored in a computer-readable storage medium when being implemented in the form of a software functional unit and sold or used as an independent product. Based on such an understanding, the technical solutions of this application essentially or the part contributing to a conventional technology may be implemented in a form of a software product. The computer software product is stored in a storage medium and includes several instructions for instructing a computer device (which may be a personal computer, a server, or a network device) to perform all or some steps in the methods described in embodiments of this application. The foregoing storage medium includes any medium that can store program code, such as a USB flash drive, a removable hard disk, a read-only memory (read-only memory, ROM for short), a random access memory (random access memory, RAM for short), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A video processing method, applied to an electronic device, wherein the method comprises:
receiving an editing operation for a target video;
displaying a first preview interface in response to the editing operation for the target video, wherein the first preview interface comprises a preview box, the target video is displayed in the preview box, and the target video is a video obtained after a target video file is decoded;
receiving a first operation for the first preview interface; and
displaying a second preview interface in response to the first operation, wherein the second preview interface comprises a preview box, a first window, and a second window; wherein
at a first moment, the target video is displayed in the preview box, an $i^{th}$ frame of video image of a first video is displayed in the first window, an $i^{th}$ frame of video image of a second video is displayed in the second window, the first video is a video obtained after a first sampled video is rendered by using a first filter, the first video comprises m frames of video images, the second video is a video obtained after a second sampled video is rendered by using a second filter, the second video comprises m frames of video images, both the first sampled video and the second sampled video are videos formed by sampling m frames of video images from the video obtained after the target video file is decoded, i is an integer greater than 0 and less than m, and m is an integer greater than 1; and
at a second moment, the target video is displayed in the preview box, an $(i+1)^{th}$ frame of video image of the first video is displayed in the first window, and an $(i+1)^{th}$ frame of video image of the second video is displayed the second window.

2. The method according to claim 1, wherein that both the first sampled video and the second sampled video are videos formed by sampling m frames of video images from the video obtained after the target video file is decoded comprises:
decoding the target video file once to obtain a third video, and sampling m frames of video images in the third video to form the first sampled video and the second sampled video respectively; wherein a value of m is less than a quantity of frames of video images comprised in the third video.

3. The method according to claim 2, wherein the sampling m frames of video images in the third video to form the first sampled video and the second sampled video respectively comprises:
sampling the m frames of video images in the third video in a manner in which one frame of video image is sampled from every three frames of video images, to form the first sampled video and the second sampled video respectively.

4. The method according to claim 2, wherein a resolution of the first video and a resolution of the second video are less than a resolution of the target video.

5. The method according to claim 1, wherein a frame rate at which the first video is displayed in the first window and a frame rate at which the second video is displayed in the second window are less than a frame rate at which the target video is displayed in the preview box.

6. The method according to claim 1, wherein that both the first sampled video and the second sampled video are videos formed by sampling m frames of video images from the video obtained after the target video file is decoded comprises:
separately decoding the target video file twice to obtain two third videos, sampling m frames of video images in one of the two third videos to form the first sampled video, and sampling m frames of video images in the other third video to form the second sampled video.

7. The method according to claim 1, wherein the second preview interface further comprises a progress display box whose display size is less than a display size of the preview box, a video image in a fourth video is displayed in the progress display box, and the fourth video is the same as the target video; wherein a resolution of the fourth video is less than a resolution of the target video.

8. The method according to claim 1, wherein display sizes of the first window and the second window are the same, and display sizes of the first window and the second window are less than a display size of the preview box.

9. The method according to claim 1, wherein
the displaying a first video in the first window comprises: cyclically displaying the first video in the first window; and
the displaying a second video in the second window comprises: cyclically displaying the second video in the second window.

10. The method according to claim 1, wherein the method further comprises:
receiving a second operation for the second preview interface, wherein the second operation is used to indicate a target filter selected by a user; and
displaying a third preview interface in response to the second operation, wherein the third preview interface comprises a preview box, a first window, and a second window; wherein
a fifth video is displayed in the preview box, the first video is displayed in the first window, the second video is displayed in the second window, and the fifth video is a video obtained after the target video is rendered by using the target filter.

11. An electronic device, comprising a memory configured to store a computer program instruction and a processor configured to execute the program instruction, wherein when the computer program instruction is executed by the processor, the electronic device is triggered to perform the following steps:
receiving an editing operation for a target video;
displaying a first preview interface in response to the editing operation for the target video, wherein the first preview interface comprises a preview box, the target video is displayed in the preview box, and the target video is a video obtained after a target video file is decoded;
receiving a first operation for the first preview interface; and displaying a second preview interface in response to the first operation, wherein the second preview interface comprises a preview box, a first window, and a second window;

wherein at a first moment, the target video is displayed in the preview box, an $i^{th}$ frame of video image of a first video is displayed in the first window, an $i^{th}$ frame of video image of a second video is displayed in the second window, the first video is a video obtained after a first sampled video is rendered by using a first filter, the first video comprises m frames of video images, the second video is a video obtained after a second sampled video is rendered by using a second filter, the second video comprises m frames of video images, both the first sampled video and the second sampled video are videos formed by sampling m frames of video images from the video obtained after the target video file is decoded, i is an integer greater than 0 and less than m, and m is an integer greater than 1; and at a second moment, the target video is displayed in the preview box, an $(i+1)^{th}$ frame of video image of the first video is displayed in the first window, and an $(i+1)^{th}$ frame of video image of the second video is displayed the second window.

12. The electronic device according to claim 11, wherein that both the first sampled video and the second sampled video are videos formed by sampling m frames of video images from the video obtained after the target video file is decoded comprises:

decoding the target video file once to obtain a third video, and sampling m frames of video images in the third video to form the first sampled video and the second sampled video respectively; wherein a value of m is less than a quantity of frames of video images comprised in the third video.

13. The electronic device according to claim 12, wherein the sampling m frames of video images in the third video to form the first sampled video and the second sampled video respectively comprises:

sampling the m frames of video images in the third video in a manner in which one frame of video image is sampled from every three frames of video images, to form the first sampled video and the second sampled video respectively.

14. The electronic device according to claim 11, wherein a frame rate at which the first video is displayed in the first window and a frame rate at which the second video is displayed in the second window are less than a frame rate at which the target video is displayed in the preview box.

15. The electronic device according to claim 11, wherein that both the first sampled video and the second sampled video are videos formed by sampling m frames of video images from the video obtained after the target video file is decoded comprises:

separately decoding the target video file twice to obtain two third videos, sampling m frames of video images in one of the two third videos to form the first sampled video, and sampling m frames of video images in the other third video to form the second sampled video.

16. The electronic device according to claim 11, wherein the second preview interface further comprises a progress display box whose display size is less than a display size of the preview box, a video image in a fourth video is displayed in the progress display box, and the fourth video is the same as the target video; wherein resolution of the fourth video is less than resolution of the target video.

17. The electronic device according to claim 11, wherein display sizes of the first window and the second window are the same, and display sizes of the first window and the second window are less than a display size of the preview box.

18. The electronic device according to claim 11, wherein the displaying a first video in the first window comprises:
cyclically displaying the first video in the first window; and
the displaying a second video in the second window comprises: cyclically displaying the second video in the second window.

19. The electronic device according to claim 11, wherein the electronic device is triggered to further perform the following steps:
receiving a second operation for the second preview interface, wherein the second operation is used to indicate a target filter selected by a user; and
displaying a third preview interface in response to the second operation, wherein the third preview interface comprises a preview box, a first window, and a second window; wherein
a fifth video is displayed in the preview box, the first video is displayed in the first window, the second video is displayed in the second window, and the fifth video is a video obtained after the target video is rendered by using the target filter.

20. A non-transitory computer-readable storage medium, wherein the computer-readable storage medium comprises a stored program, and when the program runs, a device in which the computer-readable storage medium is located is controlled to perform the following steps:
receiving an editing operation for a target video;
displaying a first preview interface in response to the editing operation for the target video, wherein the first preview interface comprises a preview box, the target video is displayed in the preview box, and the target video is a video obtained after a target video file is decoded;
receiving a first operation for the first preview interface; and
displaying a second preview interface in response to the first operation, wherein the second preview interface comprises a preview box, a first window, and a second window; wherein
at a first moment, the target video is displayed in the preview box, an $i^{th}$ frame of video image of a first video is displayed in the first window, an $i^{th}$ frame of video image of a second video is displayed in the second window, the first video is a video obtained after a first sampled video is rendered by using a first filter, the first video comprises m frames of video images, the second video is a video obtained after a second sampled video is rendered by using a second filter, the second video comprises m frames of video images, both the first sampled video and the second sampled video are videos formed by sampling m frames of video images from the video obtained after the target video file is decoded, i is an integer greater than 0 and less than m, and m is an integer greater than 1; and
at a second moment, the target video is displayed in the preview box, an $(i+1)^{th}$ frame of video image of the first video is displayed in the first window, and an $(i+1)^{th}$ frame of video image of the second video is displayed the second window.

* * * * *